(12) United States Patent
Takata et al.

(10) Patent No.: US 12,538,234 B2
(45) Date of Patent: Jan. 27, 2026

(54) ACCESS POINT, TERMINAL, AND COMMUNICATION METHOD

(71) Applicant: Panasonic Intellectual Property Corporation of America, Torrance, CA (US)

(72) Inventors: Tomofumi Takata, Ishikawa (JP); Yoshio Urabe, Nara (JP); Takashi Iwai, Ishikawa (JP); Lei Huang, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 480 days.

(21) Appl. No.: 17/927,301

(22) PCT Filed: Mar. 16, 2021

(86) PCT No.: PCT/JP2021/010703
§ 371 (c)(1),
(2) Date: Nov. 22, 2022

(87) PCT Pub. No.: WO2021/240958
PCT Pub. Date: Dec. 2, 2021

(65) Prior Publication Data
US 2023/0199664 A1     Jun. 22, 2023

(30) Foreign Application Priority Data

May 25, 2020   (JP) .................................. 2020-090745

(51) Int. Cl.
*H04W 52/14*         (2009.01)

(52) U.S. Cl.
CPC .................................. *H04W 52/146* (2013.01)

(58) Field of Classification Search
CPC . H04W 52/146; H04W 52/18; H04W 52/247; H04W 52/327
See application file for complete search history.

(56) References Cited

U.S. PATENT DOCUMENTS

| | | | |
|---|---|---|---|
| 2015/0043451 A1* | 2/2015 | Goto | H04B 7/024 370/329 |
| 2016/0262149 A1* | 9/2016 | Futaki | H04W 72/12 |
| 2020/0336989 A1* | 10/2020 | Rong | H04W 52/246 |

FOREIGN PATENT DOCUMENTS

| | | |
|---|---|---|
| CN | 102244923 A | 11/2011 |
| EP | 3621365 A1 | 3/2020 |
| JP | 2019134483 A | 8/2019 |

(Continued)

OTHER PUBLICATIONS

Extended European Search Report, dated Oct. 24, 2023, for European Patent Application No. 21812060.8-1206. (10 pages).

(Continued)

*Primary Examiner* — John J Lee
(74) *Attorney, Agent, or Firm* — Seed Intellectual Property Law Group LLP

(57) ABSTRACT

This access point is provided with a control circuit which, on the basis of transmission power control-related information received from another access point, generates a parameter relating to uplink transmission power control, and a transmission circuit which transmits a control signal that includes said parameter.

7 Claims, 29 Drawing Sheets

(56) References Cited

FOREIGN PATENT DOCUMENTS

WO     WO 2020082711 A1     4/2020

OTHER PUBLICATIONS

Bo et al., "Multi-AP Group Establishment," IEEE 802.11-19/1961r1, Jan. 2, 2020. (11 pages).
Chitrakar et al., "Preparations for Coordinated Ofdma," IEEE 802.11-20/0056r0, Jan. 10, 2020. (8 pages).
Doostnejad et al., "Uplink Coordinated Multi-AP," IEEE 802.11-19/1903r0, Nov. 11, 2019. (23 pages).
Huang et al., "Operation of Virtual BSS for Multi-AP Coordination," IEEE 802.11- 19/1972r1, Nov. 5, 2019. (7 pages).
IEEE Computer Society, "Draft Standard for Information technology—Telecommunications and information exchange between systems Local and metropolitan area networks- Specific requirements, Part 11: Wireless LAN Medium Access Control (MAC) and Physical Layer (PHY) Specifications, Amendment 1: Enhancements for High Efficiency WLAN," 802.11 Working Group, LAN/MAN Standards Committee, IEEE P802.11ax/D6.0, Nov. 2019. (780 pages).
International Search Report, mailed Jun. 1, 2021, for International Patent Application No. PCT/JP2021/010703. (5 pages) (with English Translation).
Kedem et al., "Multi-AP Operation—Basic Definition," IEEE 802.11-20-0617/r0, Apr. 16, 2020. (19 pages).
Verma et al., "Coordinated AP Time/Frequency Sharing in a Transmit Opportunity in 11be," IEEE 802.11-19/1582r2, Jan. 2020. (15 pages).

\* cited by examiner

| UL Target RSSI subfield | Description |
|---|---|
| 0-90 | Values 0 to 90 map to -110 dBm to -20 dBm |
| 91-126 | Reserved |
| 127 | Indicates to the STA to transmit an HE TB PPDU response at its maximum transmit power for the assigned HE-MCS |

FIG. 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 5

| Trigger Type | UL Length | More TF | CS Required | UL BW | ... | AP TX Power | ... | UL multi-AP flag | Trigger Dependent Common Info |

Common Info field

FIG. 19

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Basic with multi-AP |
| 9-15 | Reserve |

FIG. 20

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | multi-AP |
| 9-15 | Reserve |

FIG. 22

| UL Target RSSI subfield | Description |
|---|---|
| 0-90 | Values 0 to 90 map to −155dBm to 25dBm with 2dB step |
| 91-126 | Reserve |
| 127 | Indicates to the STA to transmit an HE TB PPDU response at its maximum transmit power for the assigned HE-MCS |

ACCESS POINT, TERMINAL, AND COMMUNICATION METHOD

TECHNICAL FIELD

The present disclosure relates to an access point, a terminal, and a communication method.

BACKGROUND ART

Establishment of technical specifications of the Institute of Electrical and Electronics Engineers (IEEE) 802.11be (hereinafter referred to as "11be") has been undergoing as a succeeding standard of IEEE 802.11ax (hereinafter referred to as "11ax") which is a standard of IEEE 802.11.

In 11be, Multi-AP (MAP) coordination (e.g., also referred to as "coordinated communication") has been discussed in which a plurality of access points (each also referred to as "base station" and will be referred to as "Access Point (AP)" hereinafter) and a plurality of terminals (each also referred to as "Station (STA)") perform coordinated data transmission and reception in downlink and uplink (e.g., see Non-Patent Literature (hereinafter referred to as "NPL") 1, 2, or 3).

CITATION LIST

Non Patent Literatures

NPL 1
IEEE 802.11-19/1903r0, Uplink Coordinated Multi-AP
NPL 2
IEEE 802.11-20/0056r0, Preparations for Coordinated OFDMA
NPL 3
IEEE 802.11-20/0617r0, Multi-AP Operation—Basic Definition
NPL 4
IEEE P802.11ax/D6.0, November 2019
NPL 5
IEEE 802.11-19/1582r2, Coordinated AP Time/Frequency Sharing in a Transmit Opportunity in 11be
NPL 6
IEEE 802.11-19/1961r1, Multi-AP Group Establishment, 2020 Jan. 2
NPL 7
IEEE 802.11-19/1972r1, Operation of Virtual BSS for Multi-AP Coordination, 2019 Nov. 5

SUMMARY OF INVENTION

However, methods of controlling a transmission power in radio communication such as a wireless local area network (WLAN) have not been sufficiently discussed.

One non-limiting and exemplary embodiment facilitates providing an access point, a terminal, and a communication method each capable of flexibly controlling an uplink transmission power per terminal.

An access point according to an exemplary embodiment of the present disclosure includes: control circuitry, which, in operation, generates a parameter relating to uplink transmission power control, based on information on transmission power control received from another access point; and transmission circuitry, which, in operation, transmits a control signal including the parameter.

It should be noted that general or specific embodiments may be implemented as a system, an apparatus, a method, an integrated circuit, a computer program, a storage medium, or any selective combination thereof.

According to an exemplary embodiment of the present disclosure, it is possible to flexibly control an uplink transmission power per terminal.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4 illustrates an exemplary target received signal strength indicator (RSSI):

FIG. 5 illustrates an exemplary Trigger type:

FIG. 19 illustrates an exemplary Common Info field according to Switching Method 1;

FIG. 20 illustrates an exemplary Trigger type according to Switching Method 4;

FIG. 22 illustrates an exemplary Trigger type according to Switching Method 6;

FIG. 27 illustrates an exemplary format of a target RSSI;

FIG. 30 illustrates an example of resource allocation.

DESCRIPTION OF EMBODIMENTS

Hereinafter, embodiments of the present disclosure will be described in detail with reference to the accompanying drawings.

Embodiment 1

[MAP Coordination]

Figure 1:
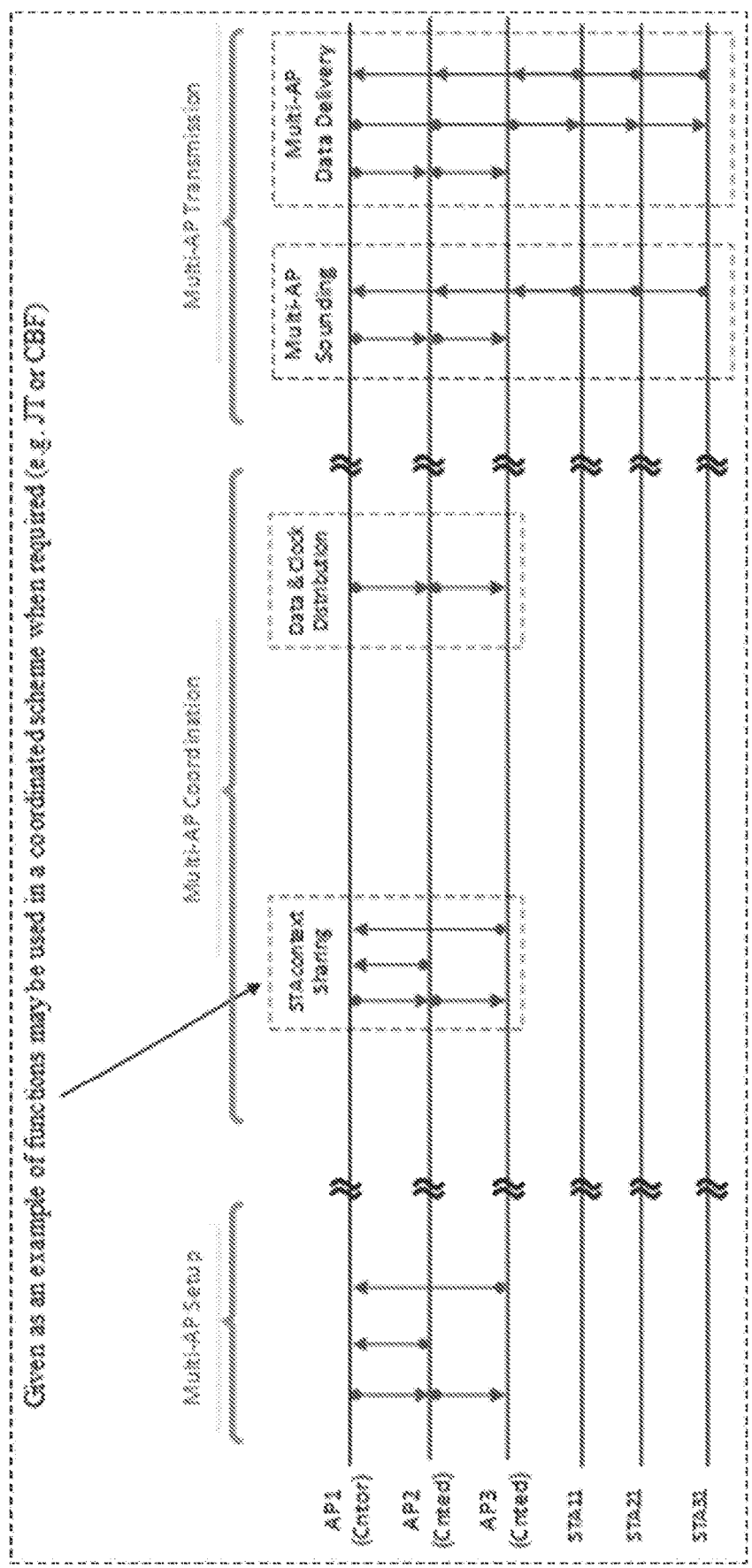
FIG. 1 illustrates an exemplary procedure of coordinated communication.

FIG. 1 illustrates an operation example of MAP coordination.

As illustrated in FIG. 1, in the MAP coordination, for example, it is discussed to perform control with the following three steps upon initiating coordinated communication (e.g., see NPL 3).

The first step is, for example, a step (or duration) of determining APs that perform coordinated control (e.g., also referred to as "Multi-AP setup" or "MAP selection"). In this step, for example, the APs that coordinate with each other (also referred to as "in coordination") may be selected by communicating, between APs, information on a capability of each AP or on STAs under the coverage of each AP.

The second step is, for example, a step (or duration) of communicating information on data to be transmitted and received by the coordinated communication (e.g., transmission method, or Modulation and Coding Scheme (MCS), and the like) between APs (e.g., also referred to as "Multi-AP coordination").

The third step is, for example, a step (or duration) of sounding, transmitting or receiving the data for the coordinated communication between APs and STAs (e.g., also referred to as "Multi-AP transmission").

For example, 11ax supports multi-user (MU) transmission in uplink (UL). Examples of the UL MU transmission include MU-Multiple Input Multiple Output (MU-MIMO), Orthogonal Frequency Division Multiple Access (OFDMA), and the like. In the UL MU transmission, for example, an AP may transmit a signal that is a trigger for an uplink signal (e.g., also referred to as "Trigger frame") to a plurality of STAs under the coverage of the AP. A terminal may, for example, transmit an uplink signal (e.g., also referred to as uplink response signal) to the AP based on the Trigger frame. Incidentally, the uplink response signal is also referred to as, for example, a Trigger based Physical layer convergence procedure Protocol Data Unit (TB PPDU).

Figure 2:
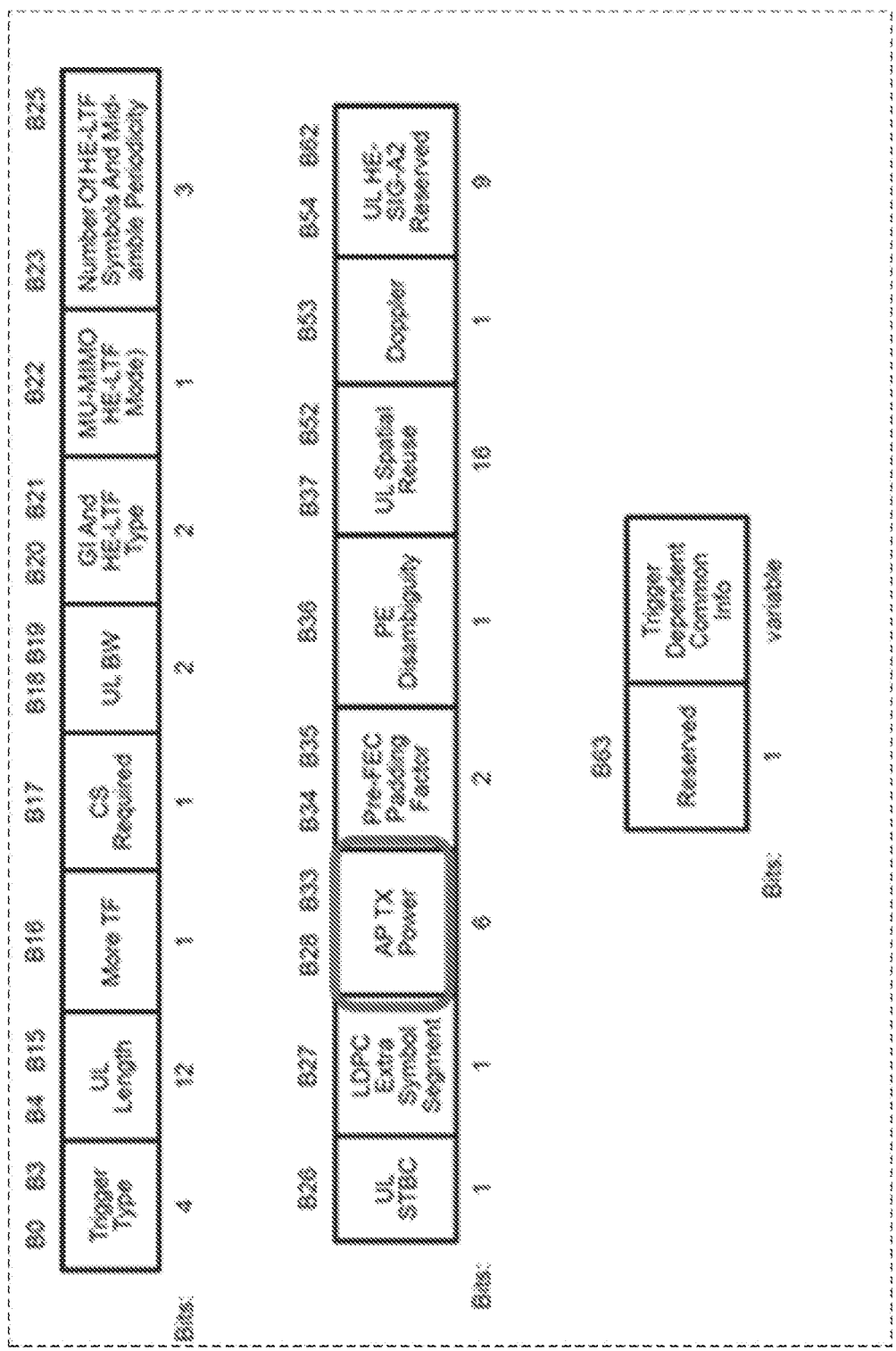
FIG. 2 illustrates an exemplary format of a Common Info field.
Figure 3:
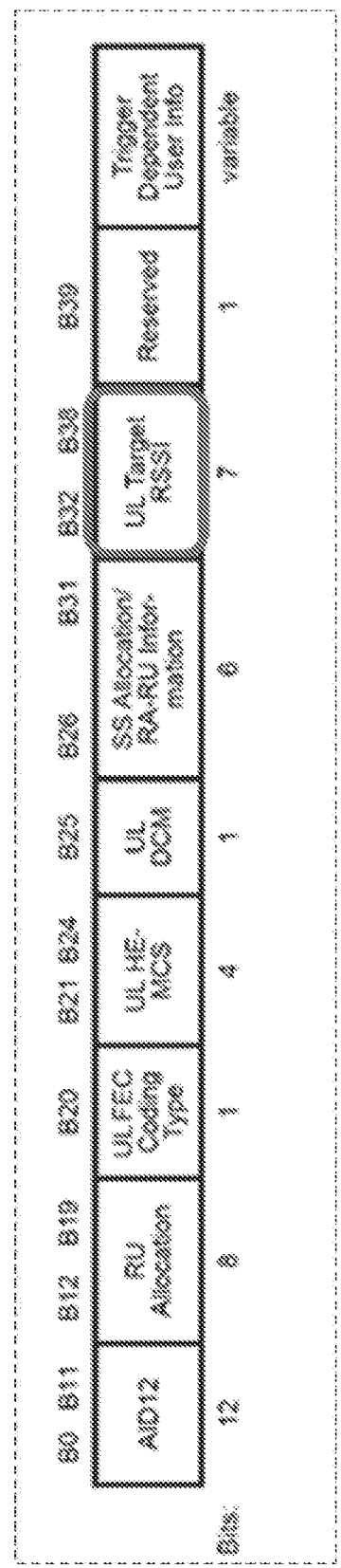
FIG. 3 illustrates an exemplary format of a User Info field.

At the time of transmission of the uplink response signal, for example, uplink transmission power control may be applied to an STA. The uplink transmission power (e.g., denoted as "$Tx_{pwr}^{STA}$") may be calculated according to the following Equations 1 and 2 by using, for example, a setting value of an "AP TX Power" field for a transmission power of the AP in downlink (DL) included in a Common Info field in a Trigger frame illustrated in FIG. 2, and a setting value of a "UL Target RSSI" field for a target RSSI (e.g., target received signal strength indicator) of the AP in uplink (UL) included in a User Info field in a Trigger frame illustrated in FIG. 3 (e.g., see, NPL 3).

Incidentally, the Common Info field may include, for example, information common to a plurality of STAs (e.g., also referred to as "common information" or "STA-common information"). Further, the user Info field may include, for example, information specific to each STA (e.g., "user information," "STA-specific information," or "user-specific information").

[1]

$$PL_{DL} = Tx_{pwr}^{AP} - DL_{RSSI} \qquad \text{(Equation 1)}$$

[2]

$$Tx_{pwr}^{STA} = PL_{DL} + Target_{RSSI} \qquad \text{(Equation 2)}$$

In Equations 1 and 2, the $PL_{DL}$s indicate path losses in downlink, the $Tx_{pwr}^{AP}$ indicates a setting value of the AP TX Power field, the $DL_{RSSI}$ indicates a received strength (e.g., RSSI) of a downlink signal to be estimated (or measured) in the STA, and the $Target_{RSSI}$ indicates a setting value of the UL Target RSSI field.

Incidentally, for the Target RSSI (e.g., $Target_{RSSI}$), a value indicated in FIG. 4 can be set, for example.

Further, for the Trigger frame, for example, as illustrated in FIG. 5, plural types (e.g., each referred to as "Trigger type") may be defined. By way of example, depending on a value of the Trigger type, a content to be indicated may be different in each of a "Trigger Dependent Common Info" field included in the Common Info field and a "Trigger Dependent User Info" field included in the User Info field (e.g., see NPL 4).

Figure 6:
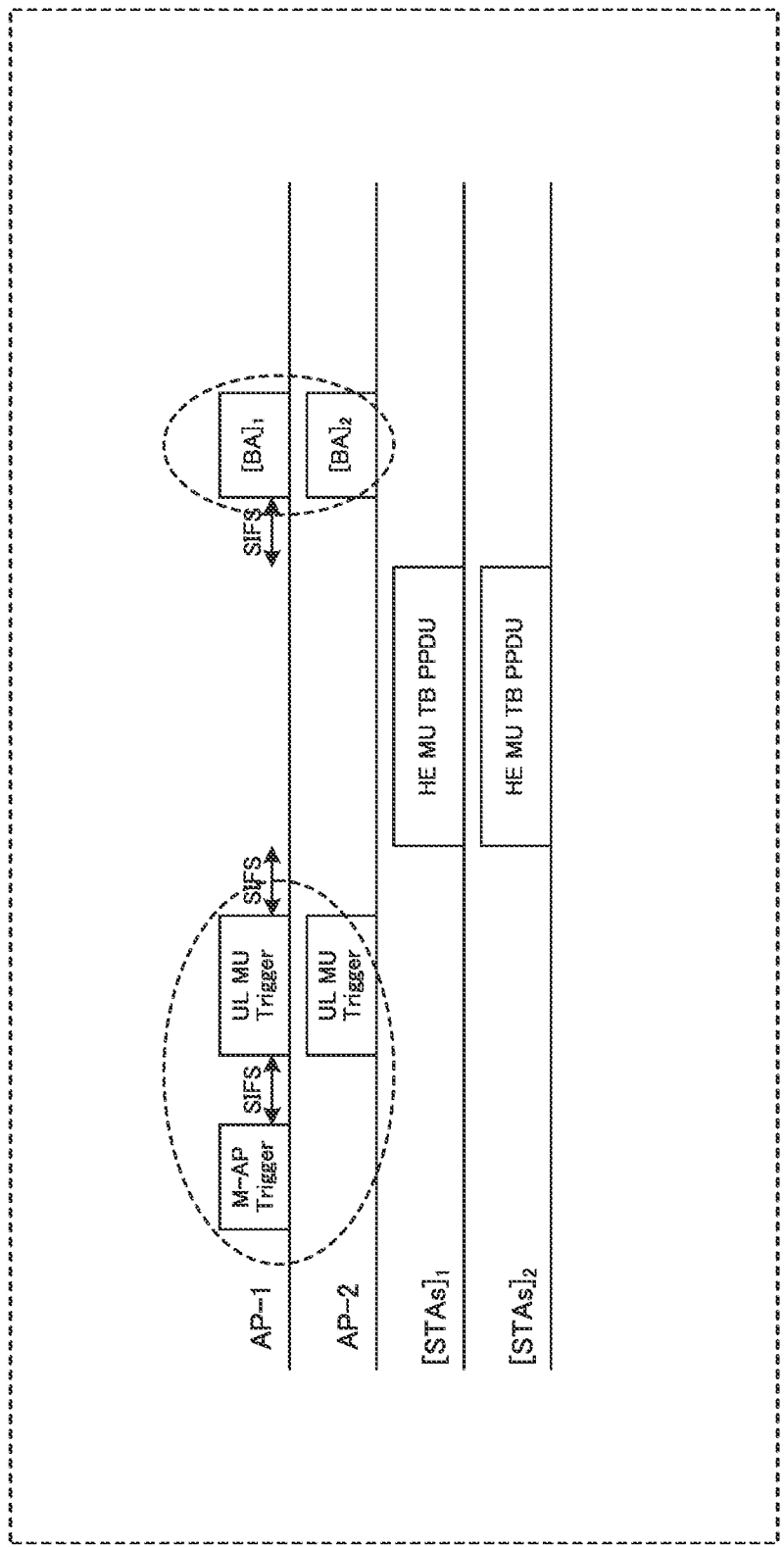
FIG. 6 illustrates an example of uplink multi-AP coordination.

In 11be, when the coordinated communication is performed for an uplink response signal, for example, as illustrated in FIG. 6, a plurality of APs (e.g., AP-1 and AP-2) may transmit Trigger frames having the same content (e.g., denoted as UL MU Trigger) at the same timing, and STAs for which the uplink response signal is requested may transmit uplink response signals (e.g., denoted as High Efficiency (HE) TB PPDU) after receiving the Trigger frames (e.g., see NPL 1). Incidentally, as illustrated in FIG. 6, examples of the Trigger frames include a Trigger frame used for communication between the APs (e.g., also referred to as MAP trigger frame or M-AP Trigger), a Trigger frame used for communication between the APs and the STAs (e.g., UL MU Trigger).

The uplink transmission power control in 11ax is performed based on, for example, one setting value "AP TX Power" (i.e., downlink transmission power of one AP) included in the Common Info field of the Trigger frame. However, for example, in the MAP coordination, the plurality of APs possibly receives uplink response signals; thus, one setting value as in 11ax may cause a reduction in the accuracy of the uplink transmission power control for each of the plurality of APs.

In one example, in a case where a downlink transmission power differs between a plurality of APs performing the coordinated communication, as indicated in Equation 1, one setting value (AP TX Power) for the downlink transmission power may reduce the estimation accuracy of path losses between the APs and STAs estimated from downlink signals from the respective APs.

Further, for example, it is assumed that in a wireless LAN such as Wi-Fi (registered trademark), as compared to the cellular communication, an arrangement of APs is irregular or a variation in performance per AP is large. For this reason, it is assumed that a case where a transmission power differs per AP occurs more often than in the cellular communication. Accordingly, when uplink MAP coordination processing is performed in radio communication with the wireless LAN, the similar uplink transmission power control as in 11ax described above easily causes a reduction in the accuracy of transmission power control.

Therefore, one exemplary embodiment of the present disclosure will describe, for example, a method for improving the accuracy of transmission power control of an uplink signal (e.g., uplink response signal) in uplink MAP coordination processing.

Figure 7:
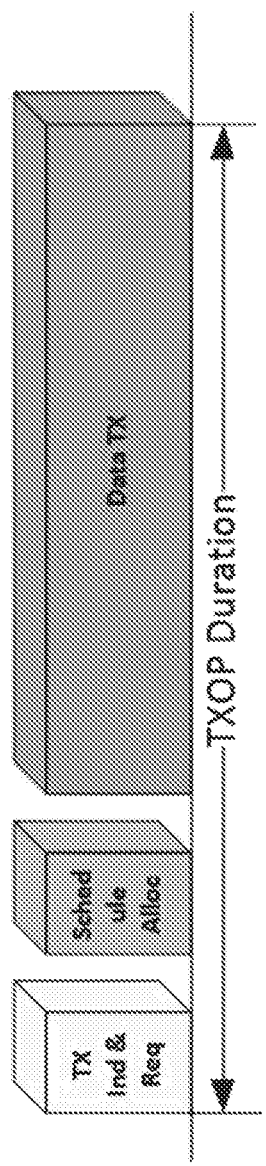
FIG. 7 illustrates an exemplary coordinated AP (CAP) transmission (Tx) phase.

Note that, in the following, for example, a duration in which information is exchanged between APs prior to transmission of a MAP trigger by an AP is referred to as a "Negotiation phase." Further, for example, a duration in which data is transmitted from the APs to the STAs after the Negotiation phase is referred to as a "Multi-AP transmission phase". Incidentally, the Negotiation phase may be, for example, a Multi-AP coordination duration of NPL 3, or may be a duration including both the Multi-AP setup and the Multi-AP coordination. Further, the Negotiation phase may include, for example, a duration for communicating control information, such as a beacon, between the APs. Further, for example, the Negotiation phase may include a duration (Schedule Allocation) indicating allocation of a resource for each of the APs (frequency or time (TXOP: transmission opportunity)), as described in NPL 5 (e.g., FIG. 7).

Further, in the following description, for example, a set of APs that perform the MAP coordination processing (e.g., coordinated communication) is referred to as an "AP group." The AP-group may be, for example, a Static Multi-AP Group or a Dynamic Multi-AP Group (e.g., see NPL 6), or may be a Virtual BSS (e.g., see NPL 7). Moreover, for example, within an AP group, for example, an AP that controls Multi-AP coordination may be referred to as a "Sharing AP" (or "Coordinator AP" or "first AP"). Furthermore, for example, an AP whose Multi-AP coordination is controlled by the Sharing AP may be referred to as a "Shared AP" (or "Coordinated AP" or "second AP"). In the AP group, the Sharing AP may initiate transmission by, for example, Carrier Sense Multiple Access/Collision Avoidance (CSMA/CA).

[Configuration of Radio Communication System]

A radio communication system according to the present embodiment may include, for example, a plurality of APs 100 and a plurality of STAs 200.

For example, in the present embodiment, AP 100 may indicate, to STA 200, information on a transmission power of an AP taking into consideration coordinated communication control for each STA 200 by using a Trigger frame. The term "indicate" may be replaced with the term "transmit" or "instruct."

The information on the transmission power of the AP may include, for example, information on a downlink transmission power of AP 100, among the plurality of Aps 100, which communicates with a plurality of STAs 200 that are communication control targets. For example, to STA 200 that does not perform the coordinated communication, information on a transmission power of AP 100 to which this STA 200 is connected (e.g., referred to as association AP) may be indicated.

On the other hand, for example, to STA 200 that performs the coordinated communication, information on a transmission power of AP 100 according to the coordinated communication control may be indicated. In one example, when a coordinated communication control method (e.g., also referred to as "coordinated communication mode") is Diversity reception, information on a transmission power of one AP 100 scheduled to receive an uplink signal may be indicated to STA 200 performing the coordinated communication. In contrast, for example, when the coordinated communication mode is joint reception, information on a combined value of transmission powers of a plurality of APs 100 scheduled to receive uplink signals may be indicated to STA 200 performing the coordinated communication.

Figure 8:
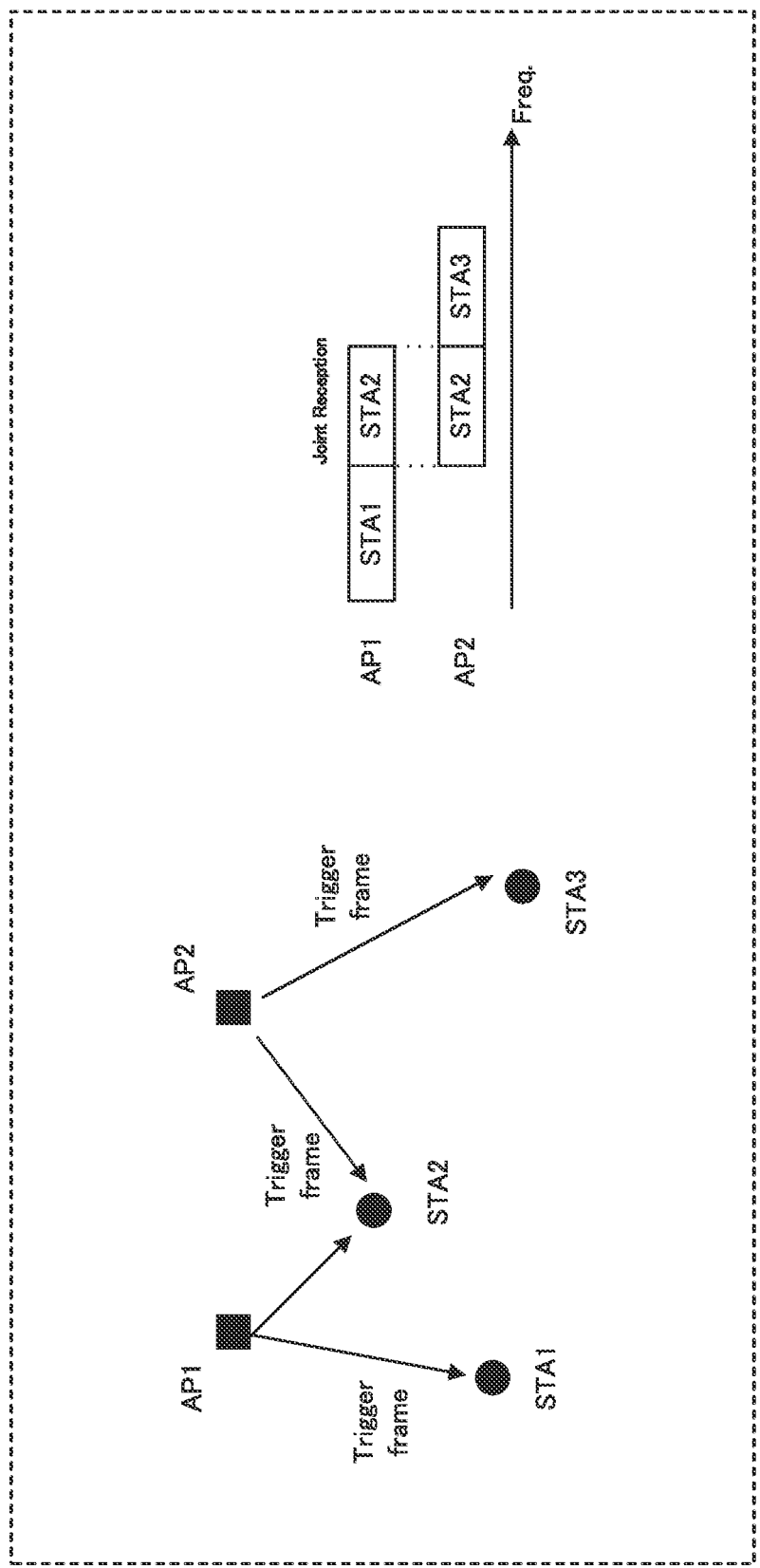
FIG. 8 illustrates a configuration example of a radio communication system and an example of resource allocation.

FIG. 8 illustrates a configuration example of the radio communication system according to the present embodiment. In FIG. 8, for example, an example is illustrated of performing communication control for STA 1, STA 2, and STA 3 by AP 1 and AP 2. Further, as illustrated in FIG. 8, STA 1 and STA 3 do not perform the coordinated communication, whereas STA 2 performs the coordinated communication (e.g., Joint Reception). In the case of resource allocation illustrated in FIG. 8, for example, in a Trigger frame, information on a transmission power of AP 1 may be indicated to STA 1, information on a value obtained by combining the transmission power of AP 1 and a transmission power of AP 2 may be indicated to STA 2, and information on the transmission power of AP 2 may be indicated to STA 3.

Incidentally, an example of indicating information on a transmission power of AP 100 for the respective STAs 200 in the Trigger frame (e.g., downlink transmission power) will be described later.

Such indication of the information on a transmission power of AP 100 in the Trigger frame allows the respective STAs 200 to perform the transmission power control according to a transmission method for the uplink signal (e.g., presence or absence of coordinated communication). Thus, for example, improving the accuracy of transmission power control of an uplink signal in the MAP coordination processing can enhance uplink throughput.

Hereinafter, configuration examples of AP 100 and STA 200 according to the present embodiment will be described.

Figure 9:
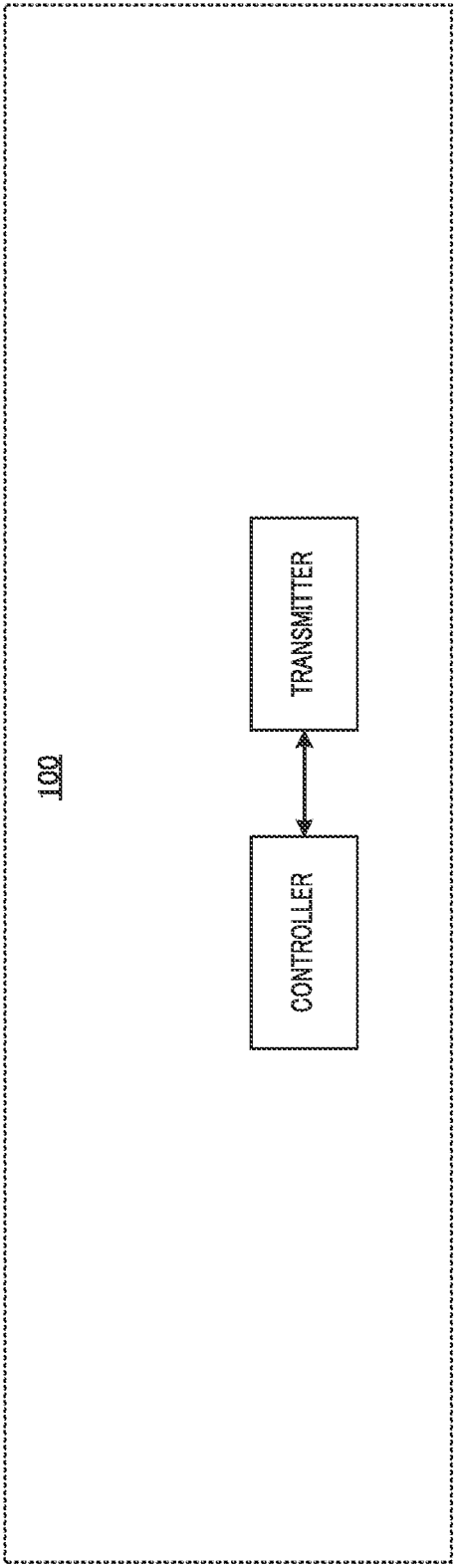
FIG. 9 is a block diagram illustrating a configuration example of part of an AP.

FIG. 9 is a block diagram illustrating a configuration example of part of AP 100 according to an exemplary embodiment of the present disclosure. In AP 100 illustrated in FIG. 9, a controller (e.g., corresponding to control circuitry) generates a parameter relating to uplink transmission power control for each of a plurality of uplinks in uplink communication control (e.g., Multi-AP control) based on communication between base stations, and a transmitter (e.g., corresponding to transmission circuitry) transmits a control signal including the parameter (e.g., Trigger frame).

Figure 10:
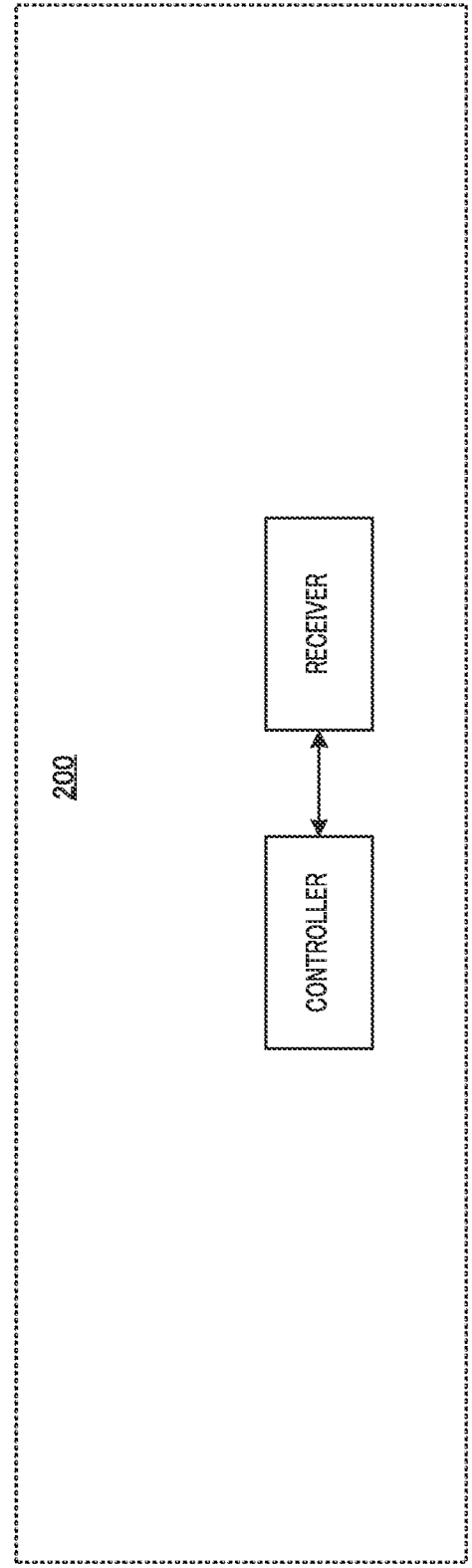
FIG. 10 is a block diagram illustrating a configuration example of part of an STA.

FIG. 10 is a block diagram illustrating a configuration example of part of STA 200 according to an exemplary embodiment of the present disclosure. In STA 200 illustrated in FIG. 10, a receiver (e.g., corresponding to reception circuitry) receives a control signal including the parameter relating to the uplink transmission power control for each of the plurality of uplinks in the uplink communication control (e.g., multi-AP control) based on the communication between the base stations, and a controller (e.g., corresponding to control circuitry) controls an uplink transmission power based on the parameter.

Configuration Example of AP 100

Figure 11:
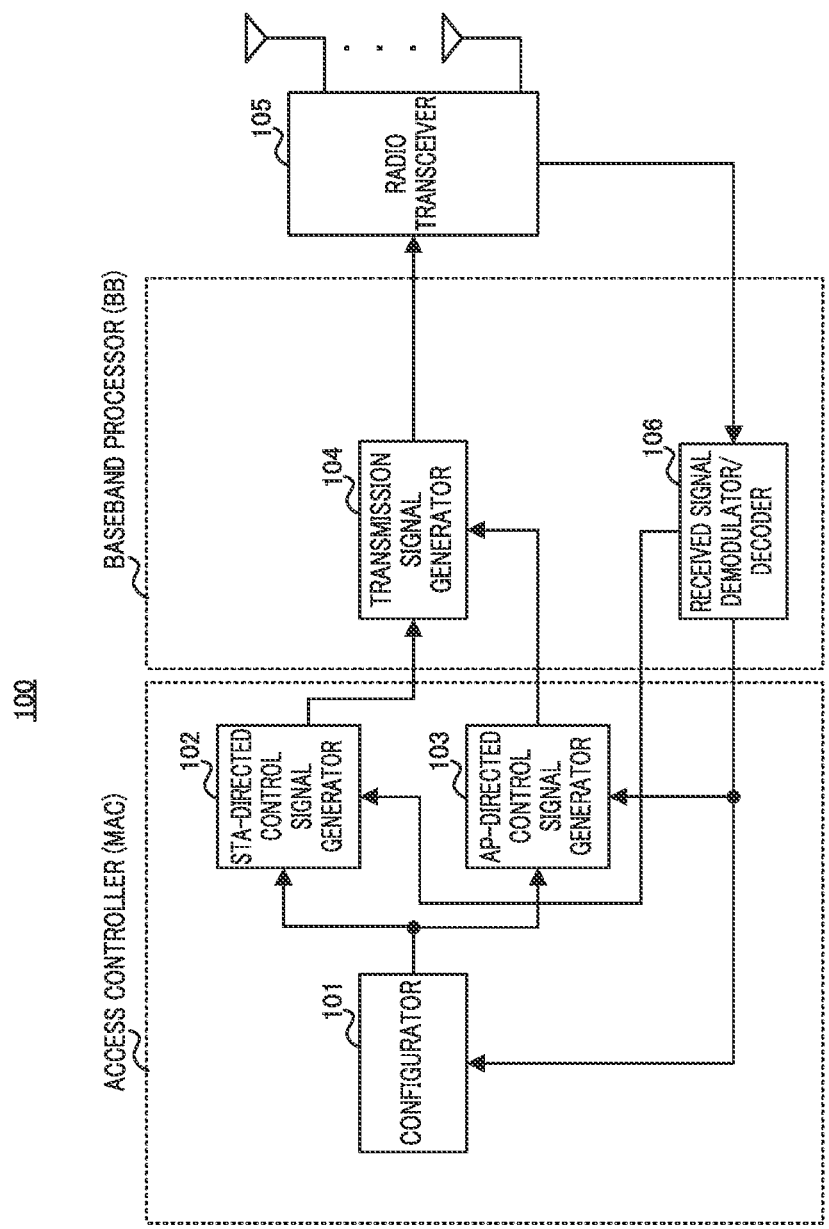
FIG. 11 is a block diagram illustrating a configuration example of the AP.

FIG. 11 is a block diagram illustrating a configuration example of AP 100. AP 100 illustrated in FIG. 11 may include, for example, configurator 101. STA-directed control signal generator 102, AP-directed control signal generator 103, transmission signal generator 104, radio transceiver 105, and received signal demodulator/decoder 106.

For example, the controller illustrated in FIG. 9 may correspond to a processor relating to generation of a transmission signal in FIG. 11 (e.g., configurator 101, STA-directed control signal generator 102, AP-directed control signal generator 103, transmission signal generator 104, received signal demodulator/decoder 106, and the like). Further, the radio transceiver illustrated in FIG. 9 may correspond to, for example, radio transceiver 105 illustrated in FIG. 11.

In addition, for example, configurator 101, STA-directed control signal generator 102, and AP-directed control signal generator 103 may be included in an access controller (e.g., Medium Access Control (MAC) processor), and transmission signal generator 104 and received signal demodulator/decoder 106 may be included in a baseband (BB) processor.

Configurator 101 may, for example, configure control information for STA 200. For example, configurator 101 may configure scheduling information, such as resource allocation information for each STA 200 and MCS. Further, configurator 101 may determine a parameter relating to the uplink transmission power control, such as the AP TX Power or the target RSSI (hereinafter, referred to as uplink transmission power control parameter), based on information input from received signal demodulator/decoder 106 (e.g., control information indicated by communication between AP groups in negotiation phase), for example. Configurator 101 may output control information including the uplink transmission power control parameter to STA-directed control signal generator 102, for example.

Further, configurator 101 may determine, based on the scheduling information, a transmission power control parameter to be indicated by the communication between AP groups in the negotiation phase, for example. Configurator 101 may output control information including the determined transmission power control parameter to AP-directed control signal generator 103, for example.

Note that, in the negotiation phase, for example, final resource allocation has not been completed in a scheduler in some cases. Thus, a transmission power control parameter to be indicated by each AP 100 in the negotiation phase may be, for example, a parameter relating to a candidate for the transmission power which is applicable by AP 100 according to a capability or coverage of each AP 100. Configurator 101 may output, to AP-directed control signal generator 103, the parameter relating to the candidate for the transmission power which is applicable by AP 100, for example.

For example, indicating the transmission power control parameter by each AP 100 based on the capability or coverage allows a sharing AP to recognize the transmission power of each AP 100 prior to the final resource allocation in the scheduler. In addition, the transmission power control parameter may include, for example, a capability of transmission power (hereinafter may also be referred to as "transmission power capability") of each AP 100. The transmission power capability may include, for example, a range of transmission power that can be output by each AP 100 (e.g., maximum value, minimum value, and step size of AP 100). Further, the transmission power control parameter may include, for example, transmission power capabilities in STAs 200 under the coverage of each AP 100.

The sharing AP may reconfigure the transmission power of each AP 100 based on the transmission power control parameter indicated from each AP 100 in the AP group, for example. In one example, the sharing AP may reconfigure the transmission power of each AP 100 based on the capability of the transmission power of AP 100 or STA 200. An example of a method of reconfiguring the transmission power includes a method of unifying transmission powers of a plurality of APs 100 included in the AP group when a difference in transmission power capabilities of APs 100 is within a threshold value. The unified transmission power may be configured to be, for example, a transmission power of one AP (e.g., maximum or minimum transmission power within AP group) among transmission powers that have been exchanged between APs 100. Alternatively, the unified transmission power may be configured to be, for example, the mean or total of transmission powers of the plurality of APs 100 in the AP group. Unifying the transmission powers allows, for example, the sharing AP to indicate only the existing TX AP Power without indicating the reconfigured the transmission power to each AP 100, which can reduce an overhead of signaling.

Meanwhile, an example of information on the transmission power capability includes control information such as "UL MU Power Capabilities element" applied in 11ax. In addition, the transmission power control parameter indicated between APs 100 may include, for example, Operating mode indication (OMI) for indicating an applicable bandwidth or the number of spatial streams (SSs). Further, the transmission power control parameter indicated between APs 100 may include, for example, a path loss. By way of example, the sharing AP may determine whether to apply the coordinated communication based on the path loss indicated from each AP 100.

Further, the transmission power control parameter indicated between APs 100 may include, for example, Spatial Reuse (parameterized spatial reuse (PSR)) to be indicated to STA 200 in the Common Info field of the Trigger frame. The sharing AP may configure the transmission power of each AP 100 and a target RSSI of STA 200 based on the PSR indicated from each AP 100, for example. In one example, at the time of application of the uplink coordinated communication, a target RSSI in each AP 100 may be reconfigured in the negotiation phase by the sharing AP, taking into consideration a combination gain. An exemplary reconfiguration method for the target RSSI at the time of application of the uplink coordinated communication will be described later.

In FIG. 11. STA-directed control signal generator 102 may generate, for example, a control signal (e.g., Trigger frame) for STA 200. For example, STA-directed control signal generator 102 may generate the control signal based on control information input from configurator 101 (e.g., resource allocation result to each STA 200 or transmission power control parameter such as AP Tx Power or target RSSI) and information input from received signal demodulator/decoder 106.

The control signal for STA 200 may include, for example, in addition to time- and frequency-resource information (e.g., resource unit (RU) allocation information, TXOP, LENGTH, and the like for uplink coordinated communication), at least one of the transmission power control parameter (e.g., transmission power, target RSSI, or the like of AP 100), information on generation of the trigger frame (e.g., UL MCS, guard interval (GI), and long training field (LTF) mode), a Trigger type for indicating the type of control signal, and terminal identification information (e.g., association ID (AID)).

Further, in the present embodiment, for example, the control signal for STA 200 may include information on a downlink transmission power per STA 200 based on a coordinated communication mode by AP 100 applied to STA 200.

STA-directed control signal generator 102 outputs the generated control signal to transmission signal generator 104, for example.

Incidentally, an exemplary format of the control signal for STA 200 at the time of uplink coordinated communication will be described later.

Meanwhile, for example, at least some of the plurality of STAs 200 indicated to transmit uplink response signals by the Trigger frame may not perform the uplink coordinated communication. Therefore, when the format of the control signal for STA 200 at the time of uplink coordinated communication is applied, the overhead of signaling may be increased. In one example, when each of the plurality of STAs 200 indicated to transmit the uplink response signals by the Trigger frame does not perform the uplink coordinated communication, it is unnecessary to indicate the transmission power control parameter taking into consideration the control method by the coordinated communication. Accordingly, AP 100 may determine, for example, whether to apply the control signal format for STA 200 at the time of uplink coordinated communication when generating the control signal (i.e., may switch format of control signal). Examples of switching methods of the control signal format will be described later.

AP-directed control signal generator 103 may generate a control signal (e.g., Trigger frame) for AP 100, for example. By way of example, AP-directed control signal generator 103 may generate the control signal based on control information input from configurator 101 (e.g., transmission power control parameter) and information input from received signal demodulator/decoder 106.

The control signal for AP 100 may include, for example, in addition to time- and frequency-resource information (e.g., RU allocation information, TXOP, LENGTH, and the like for uplink coordinated communication), at least one of a transmission power control parameter (e.g., transmission power of AP 100, target RSSI, or the like), information (e.g., UL MCS and GI, LTF mode) on generation of the control signal for STA 200 (e.g., trigger frame). Moreover, the control signal for AP 100 may include, for example, at least one of a transmission power capability of each AP 100 (e.g., range of transmission power that can be output by each AP 100 (e.g., maximum, minimum, and step size of transmission power)), and capabilities of STAs 200 under the coverage of each AP 100.

AP-directed control signal generator 103 outputs the generated control signal to transmission signal generator 104, for example.

Transmission signal generator 104 performs encoding and modulation processing on the control signal or data and ACK/Block-ACK input from STA-directed control signal generator 102 or AP-directed control signal generator 103, for example. Transmission signal generator 104 may add, to the modulated signal, for example, a pilot signal, a signal for channel estimation (e.g., LTF or Extremely High Throughput (EHT)-LTF) and the like used for frequency synchronization or timing synchronization at a reception side (e.g., other APs 100 or STAs 200) so as to generate a radio frame (transmission signal). Transmission signal generator 104 outputs the generated transmission signal to radio transceiver 105, for example.

Radio transceiver 105 performs radio transmission processing, such as D/A conversion, frequency up-conversion to a carrier frequency, on the transmission signal input from the transmission signal generator and transmits the signal resulting from the radio transmission processing to STA 200 via an antenna, for example.

When receiving an uplink signal (e.g., uplink response signal (TB-PPDU)) and feedback information transmitted from STA 200, or a control signal between AP groups, for example, AP 100 may operate as follows.

The radio signal received via the antenna is input to radio transceiver 105. Radio transceiver 105 performs radio reception processing, such as down-conversion of the carrier frequency on the received radio signal, and outputs the signal resulting from the radio reception processing to received signal demodulator/decoder 106, for example.

Received signal demodulator/decoder 106 may perform processing such as autocorrelation processing on the signal input from radio transceiver 105 and extracts the received radio frame, for example. Received signal demodulator/decoder 106 may also decode and demodulate an uplink response signal (e.g., TB-PPDU) and feedback information from STA 200, or a control signal between AP groups which are/is included in the extracted radio frame, for example. Received signal demodulator/decoder 106 may output the feedback information and the control signal between the AP groups to configurator 101, STA-directed control signal generator 102, and AP-directed control signal generator 103, for example.

[Configuration of STA 200]

Figure 12:
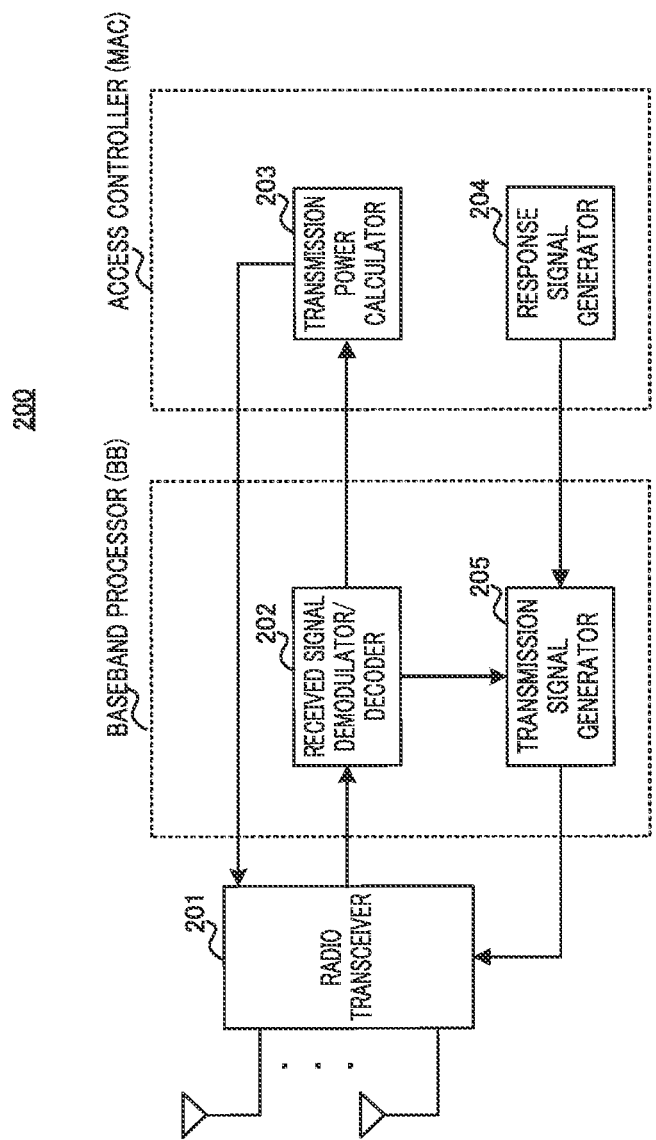
FIG. 12 is a block diagram illustrating a configuration example of the STA.

FIG. 12 is a block diagram illustrating a configuration example of STA 200 according to the present embodiment. STA 200 illustrated in FIG. 12 may include, for example, radio transceiver 201, received signal demodulator/decoder 202, transmission power calculator 203, response signal generator 204, and transmission signal generator 205.

For example, the controller illustrated in FIG. 10 may correspond to a processor relating to generation of a transmission signal in FIG. 12 (e.g., received signal demodulator/decoder 202, transmission power calculator 203, response signal generator 204, and transmission signal generator 205, and the like). Further, the radio transceiver illustrated in FIG. 10 may correspond to, for example, radio transceiver 201 illustrated in FIG. 12.

Further, for example, transmission power calculator 203 and response signal generator 204 may be included in an access controller, and received signal demodulator/decoder 202 and transmission signal generator 205 may be included in a baseband processor.

Radio transceiver 201 receives a signal transmitted from AP 100 via an antenna, then performs radio reception processing, such as down-conversion and A/D conversion on the received signal, and outputs the signal resulting from the radio reception processing to received signal demodulator/decoder 202, for example. Further, radio transceiver 201 may perform radio transmission processing, such as D/A conversion and frequency up-conversion to a carrier frequency, on the signal input from transmission signal generator 205, for example. Further, radio transceiver 201 may transmit, based on the transmission power indicated by transmission power calculator 203, the signal resulting from the radio transmission processing via the antenna, for example.

Received signal demodulator/decoder 202 may perform processing such as autocorrelation processing on the signal input from radio transceiver 201 and extracts the received radio frame, for example. Received signal demodulator/decoder 202 may demodulate and decode a control signal (e.g., Trigger frame) included in the extracted radio frame, and output a transmission power control parameter such as AP TX Power or a target RSSI to transmission power calculator 203, for example. Received signal demodulator/decoder 202 may also output, to transmission signal generator 205, a control parameter such as time- and frequency-resource information (e.g., RU allocation information, TXOP, LENGTH, and the like) or MCS, for example.

Incidentally, received signal demodulator/decoder 202 may determine, based on a switching control method for a control signal format to be described later, whether the control signal format for STA 200 at the time of uplink coordinated communication is applied, for example.

Transmission power calculator 203 may calculate a transmission power of an uplink signal (e.g., uplink response signal), for example. By way of example, transmission power calculator 203 may calculate the transmission power of the uplink response signal based on a transmission power control parameter (e.g., AP TX Power and target RSSI) input from received signal demodulator/decoder 202 and a path loss (not illustrated) estimated from the downlink signal. Transmission power calculator 203 may output information on the calculated transmission power to radio transceiver 201, for example. Incidentally, examples of a calculation method for an uplink transmission power in transmission power calculator 203 will be described later. The term "calculate" may be replaced with the term "determine." For example, the transmission power may be determined based on information in a table format.

Response signal generator 204 may generate an uplink response signal and output the generated uplink response signal to transmission signal generator 205, for example. The uplink response signal may include, for example, an ID of STA 200 and transmission information for STA 200 (e.g., data, transmission buffer status indication, or DL Data request).

Transmission signal generator 205 performs, based on a control parameter input from received signal demodulator/decoder 202 (e.g., MCS and the like), encoding and modulation on the uplink response signal input from response signal generator 204, for example. Transmission signal generator 205 may add, to the modulated signal, for example, a control signal (preamble), such as a pilot signal and a signal for channel estimation, used for frequency synchronization or timing synchronization at a reception side (e.g., AP 100) so as to generate a radio frame (transmission signal). Transmission signal generator 205 outputs the generated transmission signal to radio transceiver 201, for example.

Operation Example of AP and STA

Next, an operation example of AP 100 and STA 200 of the present embodiment will be described.

Figure 13:
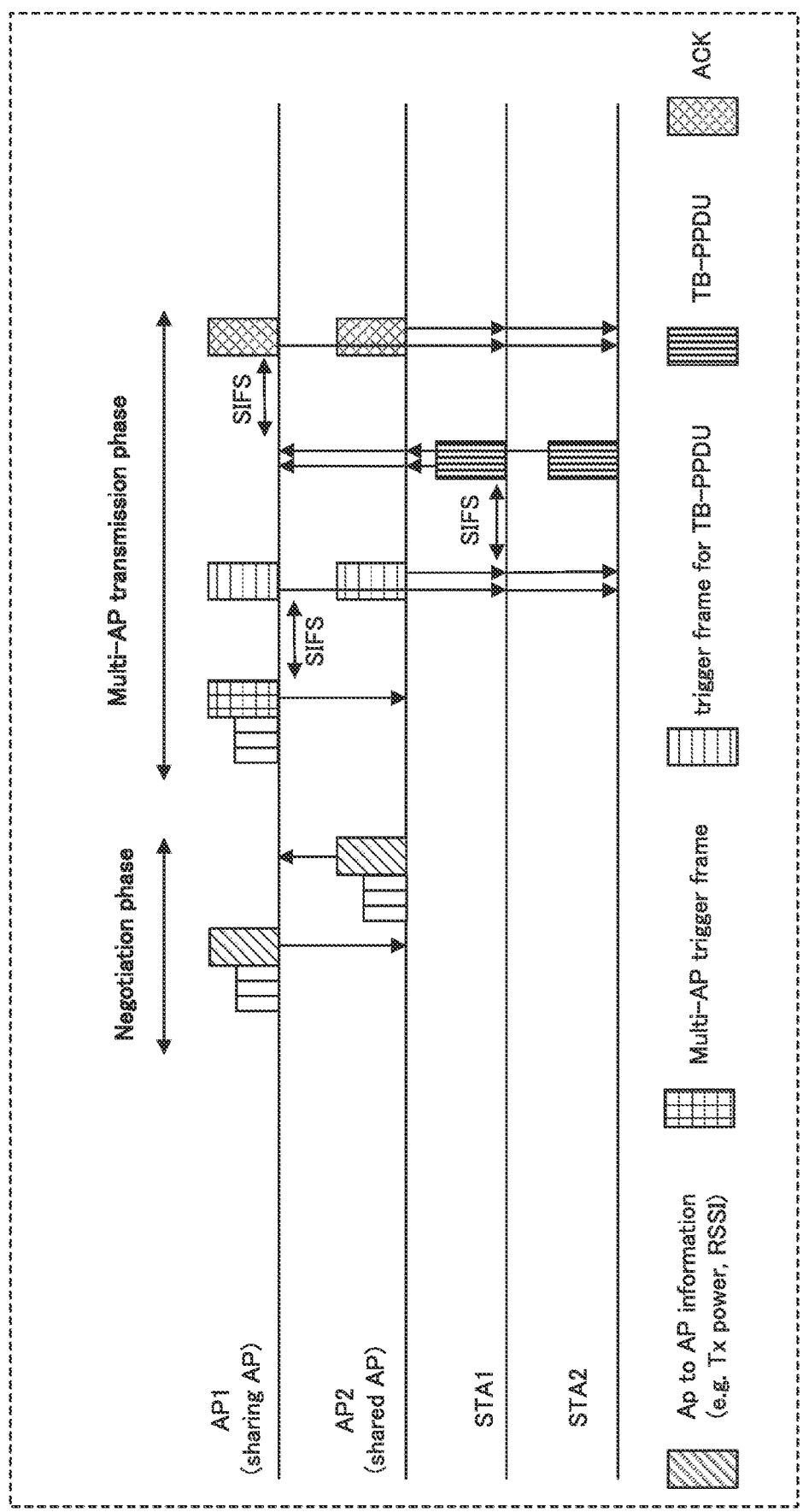
FIG. 13 is a sequence diagram illustrating an example of uplink coordinated communication processing.

FIG. 13 is a sequence diagram illustrating operation examples of APs 100 and STAs 200 according to the present embodiment.

In FIG. 13, as an example, operations of two APs 100 (e.g., AP 1 and AP 2) and two STAs 200 (e.g., STA 1 and STA 2) will be described. Further, in FIG. 13, for example, AP 1 is a sharing AP and AP 2 is a shared AP.

In FIG. 13, in the Negotiation phase, AP 1 and AP 2 may indicate, for example, time- and frequency-resource information (e.g., RU allocation information, TXOP, LENGTH, and the like for uplink coordinated communication), a transmission power control parameter (e.g., transmission power, target RSSI, or the like of each AP 100), or information on Trigger frame generation (e.g., UL MCS, GI, or LTF mode).

The transmission power control parameter in the Negotiation phase may include, for example, a transmission power capability of each AP 100 (e.g., range of transmission power that can be output by each AP 100 (e.g., maximum, minimum, and step size of AP 100)). In addition, the transmission power control parameter may include, for example, transmission power capabilities of STAs 200 under the coverage of each AP 100. This allows APs 100 to perform, based on the transmission power capabilities of each AP 100 and STAs 200, coordinated control and scheduling taking into consideration the capabilities, for example.

Also, in the Negotiation phase, for example, after the Sharing AP collects transmission power control parameters (e.g., transmission power capabilities) of the shared APs, a transmission power control parameter indicated from another AP 100 (e.g., transmission power, target RSSI, and capability of AP 100) may not fall within a specified range (e.g., X≥transmission power control parameter≥Y). In this case, the sharing AP may exclude corresponding AP 100 from APs (e.g., AP group) that perform the coordinated communication.

Incidentally, the setting values X and Y relating to the range may be set based on, for example, the transmission power, the target RSSI, and the capability of the sharing AP. For example, when the transmission power control parameter is transmission power of AP 100, X and Y may be set to, respectively, X=(transmission power of sharing AP)+α, Y=(transmission power of sharing AP)−α. The value α may be, for example, any value of an integer or a real number.

For example, the greater the difference in transmission power, target RSSI or capability between APs 100 within an AP group is, the more complicated the control of the coordinated communication is. Therefore, for example, the sharing AP can easily control the coordinated communication by excluding an AP with a large difference in transmission power control parameter value between the sharing AP (e.g., AP 100 not falling within X≥transmission power control parameter≥Y) from the APs that perform the coordinated communication.

Incidentally, part of the information described above may be indicated by a MAP trigger, for example.

As illustrated in FIG. 13, upon end of the Negotiation phase, the sharing AP (e.g., AP 1) may transmit a Multi-AP trigger frame to each of APs 100 subject to the coordinated communication (e.g., AP 2).

For example, after a specified period of time (e.g., Short Inter Frame Space (SIFS)) has elapsed from the transmission and reception of the Multi-AP trigger frame, APs 100 (e.g., AP 1 and AP 2) in the AP group may simultaneously transmit Trigger frames (e.g., Trigger frames for TB-PPDU) for triggering uplink communication of STAs 200 (e.g., STA 1 and STA 2). Incidentally, information included in PPDU having the Trigger frames may be, for example, the same information between APs 100. For example, transmission by a plurality of APs 100 of the same (common) information in the Trigger frames, STAs 200 can receive signals from respective APs 100 with interference suppressed.

Incidentally, for example, in PPDU where the Trigger frame is included, for a value such as a Cyclic shift set for each antenna or stream, a different value may be set for each AP 100. In addition, part of the preamble included in PPDU may be replaced for each AP 100. Further, a frequency resource for EHT-LTF may be different for each AP 100. Further, the preamble is, for example, a signal in units of sub channels (e.g., 20 MHz band), and even when data is a signal in a frequency band of the part of the preamble, the preamble may be a signal in a frequency band of a sub channel (e.g., 20 MHz band).

For example, as illustrated in FIG. 13, after receiving the Trigger frame, STAs 200 (e.g., STA 1 and STA 2) may check whether an AID field in a User Info field of the Trigger frame includes an AID addressed to the STAs 200 or an AID for a random access (e.g., 2045). When the AID addressed to STAs 200 or the AID for the random access is included, for example, STAs 200 may perform uplink transmission power control and generate uplink response signals (e.g., TB-PPDUs) based on a value indicated in the Common Info field and the User Info field. STA 200 may then transmit the uplink response signals to APs 100 based on the determined transmission power, for example.

Note that, in a case where the association AP individually specifies AIDs of STAs 200, each of coordinating APs 100 need not to assign an overlapping AID between APs 100 to STAs 200, for example. In other words, coordinating APs 100 may assign different AIDs between APs 100 to STAs 200. Thus, for example, in the AP group, STAs 200 subject to the coordinated communication can be identified. In one example, a range of an AID may be assigned for each AP 100, and each AP 100 may assign AIDs to associating STAs 200 within the specified ranges.

Each AP 100 may also indicate an assignment range of an AID to cooperating AP 100, for example. Upon receiving an indication of the assignment range of the AID, each AP 100 may specify an assignment range not overlapping with the indicated assignment range. This suppresses an overlap of assignment ranges of the AIDs between APs 100. Incidentally, an assignment range of an AID for each AP 100 may be indicated by a beacon.

As illustrated in FIG. 13, each AP 100 may receive an uplink response signal (e.g., TB PPDU) and transmit, to STAs 200, information (e.g., ACK or Block-ACK) on success or failure of reception (or decoding) for the uplink response signal, for example. When the coordinated communication is performed, for example, AP 100 having received the response signal may transmit ACK to STAs 200. For example, in the Diversity reception, among APs 100 that perform the coordinated communication, one AP 100 having received an uplink response signal may transmit ACK. Further, for example, in the joint reception, a plurality of APs 100 having received a response signal may transmit ACKs. ACK can be subjected to the joint transmission by transmitting ACK by each AP 100 having received the response signal, and thus, the reception performance of ACK in STA 200 can be improved.

Incidentally, when the joint reception is applied, a sharing AP may transmit ACK, and a shared AP may not transmit ACK. The Sharing AP transmits ACK while the shared AP does not transmit ACK, so that the ACK information need not to be communicated between APs 100.

Further, ACK may be configured, for example, not only to be transmitted after SIFS has elapsed since reception of an uplink response signal by AP 100, but also to be transmitted after a certain time has elapsed (referred to as Delayed ACK). For example, a response method for ACK may be changed depending on a coordinated communication method. In one example, in the Joint reception, Delayed ACK may be applied, taking into consideration a reception combination time.

Figure 14:
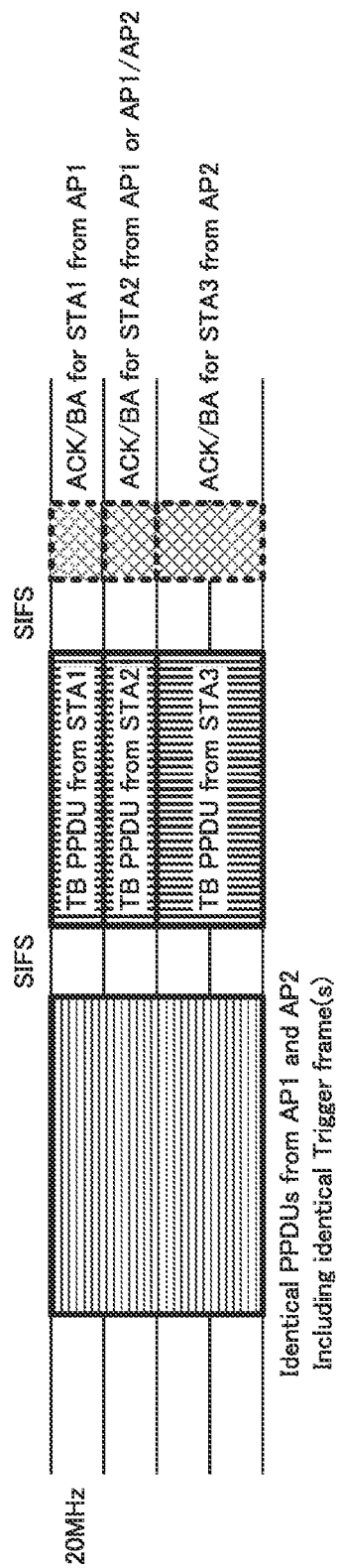
FIG. 14 illustrates an example of resource allocation.

FIG. 14 illustrates, for example, an example of allocating, in the configuration example of the radio communication system illustrated in FIG. 8, a 20 MHz band (i.e., resource) to STA 1, a 20 MHz band to STA 2, and a 40 MHz band to STA 3. In FIG. 14, for example, when transmitting a Trigger frame, AP 1 and AP 2 may transmit, in an 80 MHz band, the same (common) information to STA 1, STA 2, and STA 3. STA 1, STA 2, and STA 3 each may transmit an uplink response signal (e.g., TB PPDU) in the band indicated by the Trigger frame, for example. In addition, AP 1 and AP 2 may transmit ACKs (or BAs) for each STA in the band in which the uplink response signal from each of STA 1, STA 2, and STA 3 is transmitted, for example.

[Target RSSI Selection Method when Uplink Coordinated Communication is Applied]

Next, a description will be given of an exemplary selection method for a target RSSI (e.g., uplink target RSSI) for each STA 200 when the uplink coordinated communication is applied, according to the present embodiment.

<Selection Method 1>

In Selection Method 1, for example, AP 100 may select the maximum target RSSI among target RSSIs for STAs 200 configured by each AP 100 that performs the coordinated communication.

As an example, a selection example of a target RSSI for STA 2 illustrated in FIG. 8 will be described. For example, when a target RSSI configured by AP 1 for STA 2 is RSSI #1 and a target RSSI configured by AP 2 for STA 2 is RSSI #2, a value of max (RSSI #1, RSSI #2) may be selected as the target RSSI for STA 2.

Selecting the maximum target RSSI as the target RSSI for STA 200 makes it possible to configure the highest reception level among the reception levels of the uplink response signals that are based on the target RSSIs configured for STAs 200, which can improve the possibility of successful reception of an uplink response signal in AP 100.

<Selection Method 2>

In Selection Method 2, for example, AP 100 may select the minimum target RSSI among target RSSIs for STAs 200 configured by each AP 100 that performs the coordinated communication.

As an example, a selection example of a target RSSI for STA 2 illustrated in FIG. 8 will be described. For example, when a target RSSI configured by AP 1 for STA 2 is RSSI #1 and a target RSSI configured by AP 2 for STA 2 is RSSI #2, a value of min (RSSI #1, RSSI #2) may be selected as the target RSSI for STA 2.

Selecting the minimum target RSSI as the target RSSI for STA 200 makes it possible to reduce interference (e.g., Adjacent-channel interference (ACI)) to the response signals of other STAs caused by the uplink response signal transmitted from STA 200. Thus, the possibility of successful reception in AP 100 of the uplink response signals of the other STAs can be improved.

<Selection Method 3>

In Selection Method 3, for example, AP 100 may select a mean value of target RSSIs for STAs 200 configured by each AP 100 that performs the coordinated communication.

Selecting the mean value as the target RSSI for STA 200 makes it possible to reduce ACI to other STAs caused by the uplink response signal transmitted from STA 200 while maintaining the reception performance of an uplink response signal in AP 100.

Alternatively, AP 100 may calculate a mean value by weighting target RSSIs configured for each STA 200, for example. In one example, a weighting factor may be increased for the target RSSI for the Sharing AP and a weighting factor may be decreased for the target RSSI for the Shared AP.

Selection Methods 1 to 3 have been each described, thus far. Note that, a selection method for a target RSSI for each STA 200 when the uplink coordinated communication is applied is not limited to Selection Methods 1 to 3 mentioned above. In one example, a target RSSI for STA 200 may be configured based on any one or more target RSSIs among the target RSSIs configured for certain STA 200 in each AP 100.

[Calculation Method for Trigger Frame Format for Uplink Coordinated Communication and Uplink Transmission Power]

Hereinafter, a description will be given of a Trigger frame format for the uplink coordinated communication and an exemplary calculation (determination) method for an uplink transmission power in STA 200 according to the present embodiment.

In the present embodiment, for example, information on a transmission power of AP 100 (i.e., transmission power control parameter) may be configured for each STA 200 by the Trigger frame. In one example, the transmission power control parameter may include, for each of a plurality of STAs 200, information on a downlink transmission power determined corresponding to the type of uplink communication control (e.g., multi-AP control) based on communication between APs 100. For example, the type of multi-AP control for each STA 200 may include, for example, a case of performing coordinated uplink communication control and a case of performing coordinated uplink communication control. Further, when performing the coordinated uplink communication control, for example, the Joint transmission and the Diversity reception may be included.

Example 1

Figure 15:
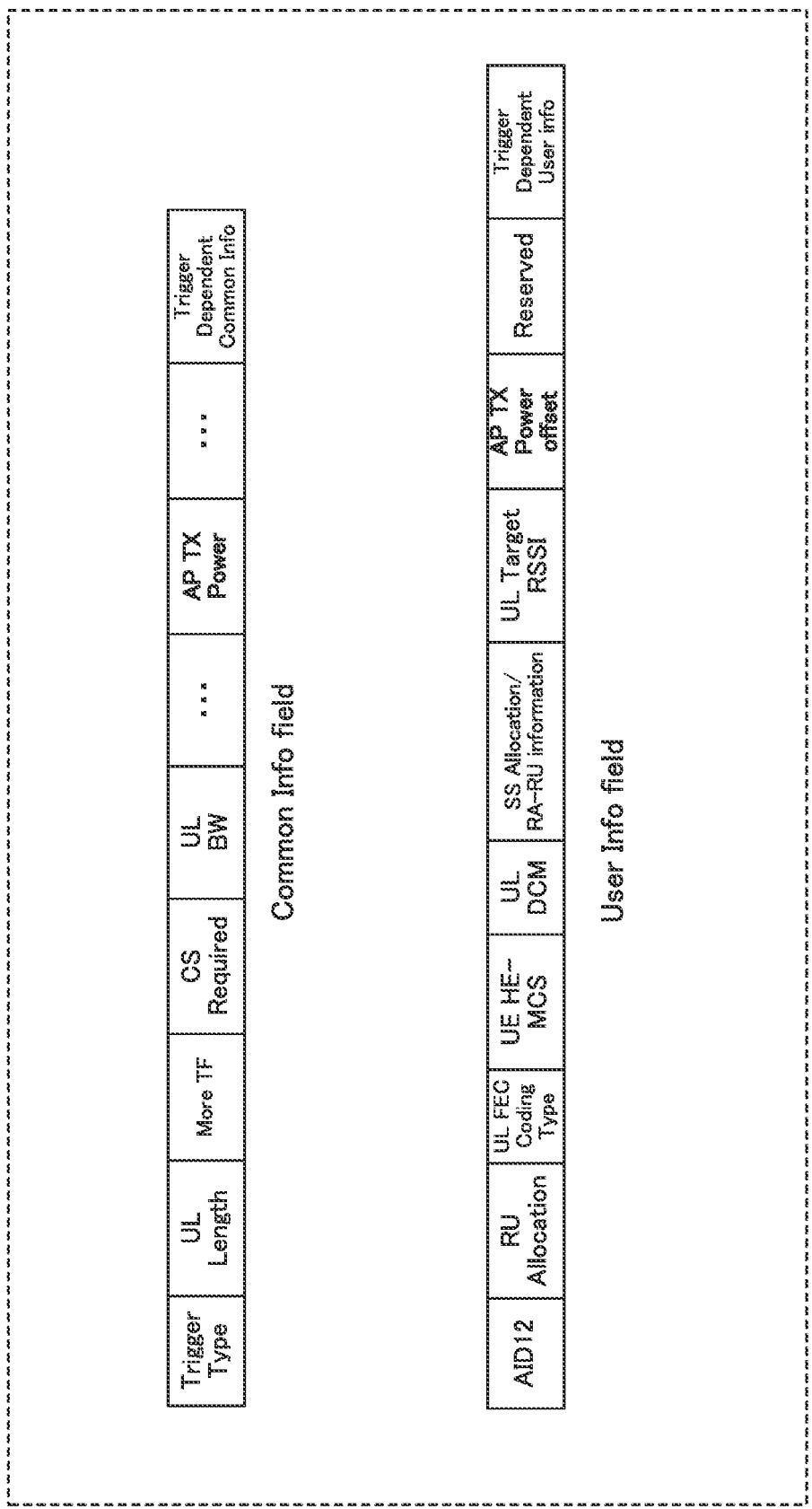
FIG. 15 illustrates examples of a Common Info field and a User Info field according to Example 1.

FIG. 15 illustrates examples of a Common Info field and a User Info field of the Trigger frame in Example 1. Note that, the Common Info field and the User Info field of the Trigger frame may include afield different from the fields illustrated in FIG. 15. Further, part of the fields illustrated in FIG. 15 may not be included.

The common Info field illustrated in FIG. 15 may include, for example, a setting value (e.g., also referred to as a reference value) "AP TX Power" of the transmission power of AP 100 that is commonly used when the plurality of STAs 200 to which the Trigger frame is to be transmitted calculates the uplink transmission power. For the "AP TX Power", for example, a transmission power of the sharing AP and a mean value of transmission powers of APs 100 belonging to an AP group that performs the coordinated communication (e.g., also referred to as mean transmission power), or any one of transmission powers of APs 100 belonging to the AP group (e.g., maximum value or minimum value) may be set.

Further, the User Info field illustrated in FIG. 15 may include, for example, an offset value (e.g., "AP TX Power offset") for a value "AP TX Power" common to the plurality of STAs 200 included in the Common Info field.

For example, in a case where the setting value of the AP TX Power is the transmission power of the sharing AP or the mean transmission power of the AP group, a value of the "AP TX Power offset" may be negative. Therefore, for example, when a field of the "AP TX Power offset" is four bits, an offset value such as −8 to +7 [dB] may be set.

AP 100 may determine AP TX Power offset based on a coordinated communication mode (e.g., Diversity reception, joint reception, or the like), for example. In one example, in selection of the coordinated communication mode, the Joint reception may be applied between a plurality of APs 100 where a path loss between STAs 200 and each of APs 100 is equal to or less than X dB. On the other hand, between a plurality of APs 100 where the path loss is greater than X dB, for example, the Diversity reception by one AP 100 with the minimum path loss may be applied.

For example, for STA 200 to which the Joint reception is applied, the transmission power combined between the plurality of APs 100 is used, and thus, STA 200 can calculate a path loss in downlink.

As an example, a case of the configuration of the radio communication system illustrated in FIG. 8 will be described.

The transmission power (TxPow$_{AP1}$ [dBm]) of the Sharing AP (AP 1) may be set as the setting value of the "AP TX Power" of the Common Info field, for example.

Further, 0 [dB] may be set as the setting value of the "AP TX Power offset" of the User Info field for STA 1, for example. That is, for the setting value of the "AP TX Power offset" for STA 1, a value obtained by subtracting AP TX Power (here, transmission power of AP 1) from the transmission power of AP 1 may be set.

Further, for the setting value of the "AP TX Power offset" of the User Info field for STA 2, a value obtained by subtracting AP TX Power (here, transmission power of AP 1) from the power obtained by combining transmission powers of AP 1 and AP 2, taking into consideration, for example, the Joint reception by AP 1 and AP 2 may be set, as illustrated in following Equation 3.

[Equation 3]

$$10 \times \log 10\left(10^{\frac{Tx_{Pow}^{Ap1}}{10}} + 10^{\frac{Tx_{Pow}^{Ap2}}{10}}\right) - Tx_{Pow}^{Ap1} \quad [3]$$

Further, for the setting value of the "AP TX Power offset" for STA 3, a value obtained by subtracting AP TX Power (here, transmission power of AP 1) from the transmission power of AP 2 may be set, as illustrated in following Equation 4.

[4]

$$Tx_{Pow}^{Ap2} - Tx_{Pow}^{Ap1} \quad \text{(Equation 4)}$$

For example, STA 200 may calculate an uplink transmission power (e.g., denoted as $Tx_{Pow}^{STA}$) based on the setting values of the "AP TX Power" in the Common Info field of the Trigger frame (e.g., denoted as $Tx_{Pow}^{AP}$) and the "AP Tx Power offset" of the User Info field (e.g., denoted as $Tx_{PowOffset}^{AP}$), according to following Equations 5 and 6.

[5]

$$PL_{DL} = Tx_{Pow}^{AP} + Tx_{PowOffset}^{AP} - DL_{RSSI} \quad \text{(Equation 5)}$$

[6]

$$Tx_{Pow}^{STA} = PL_{DL} + Target_{RSSI} \quad \text{(Equation 6)}$$

Thus, for example, in FIG. 8, an uplink transmission power based on the transmission power of AP 1 is configured for STA 1, and an uplink transmission power based on the combined value of the transmission powers of AP 1 and AP 2 is configured for STA 2, and an uplink transmission power based on the transmission power of AP 2 is configured for STA 3.

Thus, in Example 1, AP 100 uses a Trigger frame to indicate, to STA 200, information on a transmission power taking into consideration a coordinated communication mode for each STA 200 (i.e., transmission power of AP 100 taking into consideration MAP coordination processing per STA 200), for example. Further, STA 200 can recognize, based on the received Trigger frame, the transmission power of AP 100 taking into consideration the coordinated communication mode, for example. Even when a transmission power is different in each of a plurality of APs 100, for example, AP 100 can indicate information on the transmission power of AP 100 according to an uplink transmission method (e.g., coordinated communication mode) for each STA 200. Thus, even when the coordinated communication mode is applied, each STA 200 can improve the estimation accuracy of the path loss in downlink and correctly calculate (determine) the uplink transmission power, so that uplink throughput can be improved.

Figure 16:
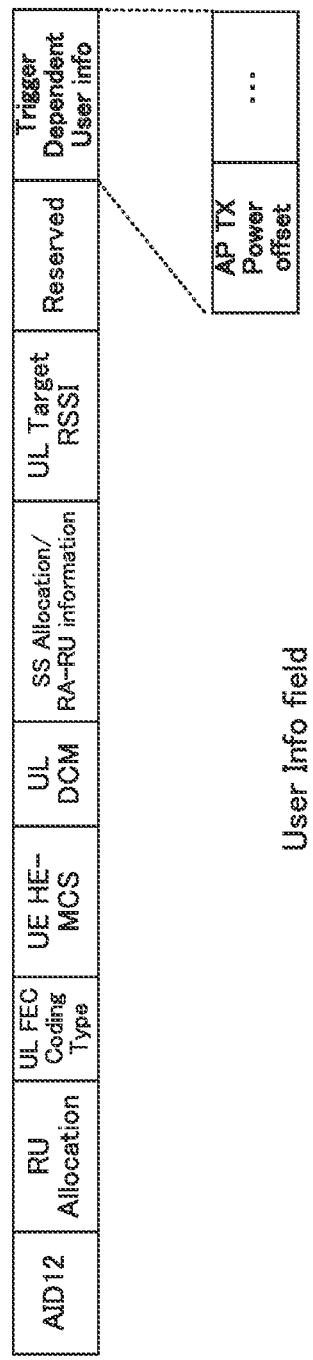
FIG. 16 illustrates an exemplary User info field according to Example 1.

Meanwhile, in a case where any of "Trigger format switching Methods 4 to 6" described later is applied, "AP TX Power offset" of a User Info field applied in the uplink coordinated communication mode may be arranged in, for example, a Trigger Dependent User Info field as illustrated in FIG. 16.

Example 2

Figure 17:
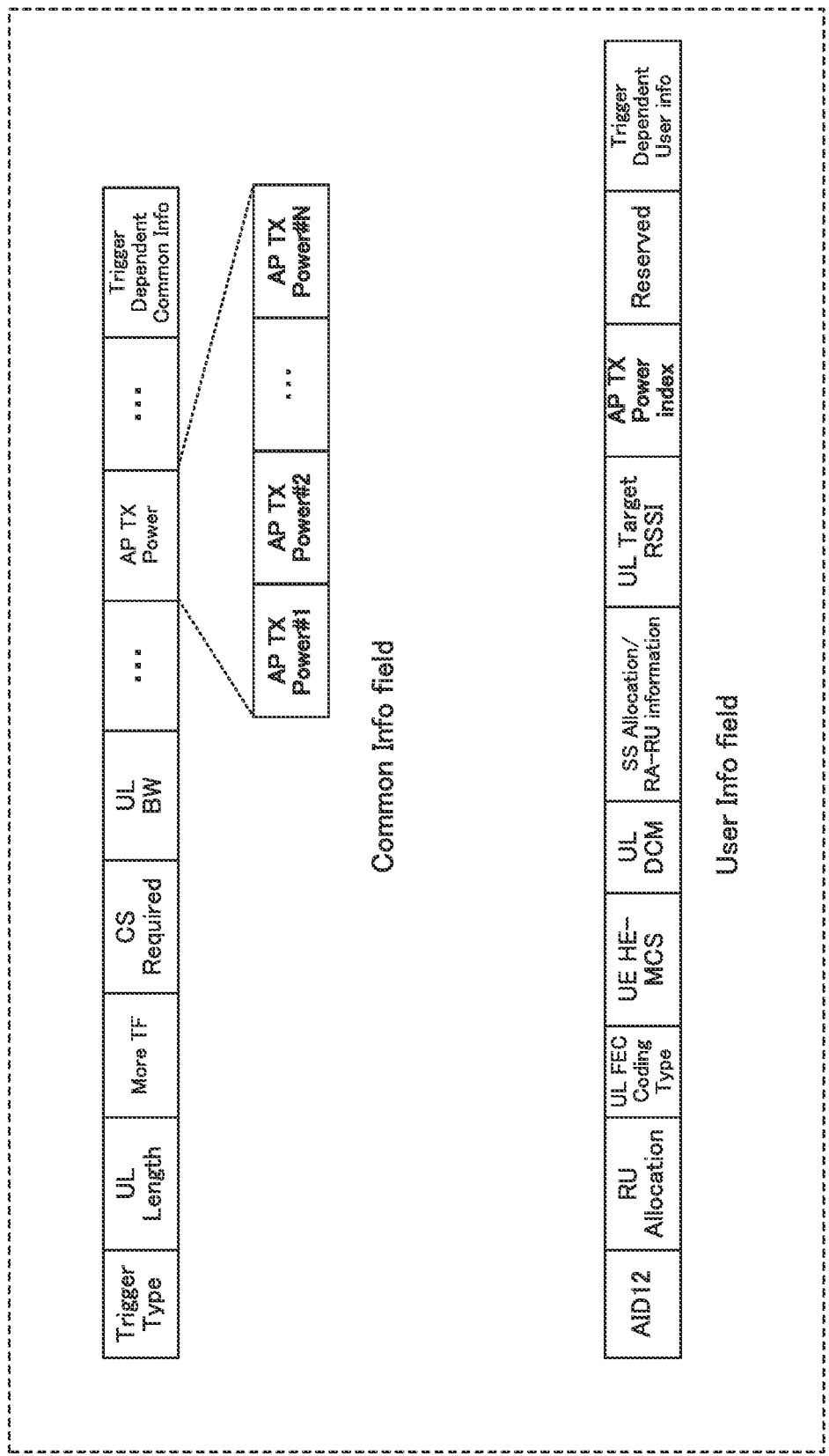
FIG. 17 illustrates examples of a Common Info field and a User Info field according to Example 2.

FIG. 17 illustrates examples of a Common Info field and a User Info field of the Trigger frame in Example 2. Note that, the Common Info field and the User Info field of the Trigger frame may include a field different from the fields illustrated in FIG. 17. Further, part of the fields illustrated in FIG. 17 may not be included.

The common Info field illustrated in FIG. 17 (e.g., APTX Power field) may include, for example, a set of transmission powers (e.g., AP Tx Power #1 to AP Tx Power #N) taking into consideration a coordinated communication mode per STA 200 (e.g., Diversity reception, joint reception, or the like).

For example, in the configuration example of the radio communication system illustrated in FIG. 8, the Common Info field may include the transmission power of AP 1, the transmission power of AP 2, and a set of combined transmission powers of AP 1 and AP 2 taking into consideration the joint reception (e.g., denoted as "AP #1+AP #2 transmission power").

Incidentally, the number N of sets (hereinafter may also be referred to as set number N) of the transmission power of AP 100 may be determined, for example, by any of the following methods.

For example, a value of the set number N may be a fixed value. The value of the set number N may be preliminary specified (or defined) by specifications, for example. The fixed value may be, for example, the expected maximum number of APs 100 that perform the coordinated communication or a value based on the maximum number of APs 100 taking into consideration combination of APs 100 in the joint reception. Setting the value of the set number N to a fixed value can simplify generation processing of the Trigger frame in AP 100 and determination processing for the Trigger frame in STA 200.

Further, for example, the value of the set number N may be a value to be indicated (i.e., set) from AP 100 to STA 200. The value of the set number N may be indicated by, for example, a beacon or control information in the Negotiation phase. For example, AP 100 can reduce signaling overhead by indicating the set number N, taking into consideration the coordinated communication in the AP group.

Meanwhile, the User Info field illustrated in FIG. 17 may include, for example, an index (e.g., AP TX Power index) indicating which value STA 200 uses in the transmission power set included in the Common Info field. In other words, the User Info field may include an index associated with information on a plurality of downlink transmission powers configured for the Common Info field.

For example, in the configuration example of the radio communication system illustrated in FIG. 8, a case will be described where, in the Common Info field, the transmission power of AP 1 is configured for AP Tx Power #1, the transmission power of AP 2 is configured for AP Tx Power #2, and the AP #1+AP #2 transmission power is configured for AP Tx Power #3. In this case, index #1 may be configured for a User info field for STA 1, index #3 may be configured a User Info field for STA 2, and index #2 may be configured for a User Info field for STA 3.

For example, STA 200 may calculate an uplink transmission power (e.g., denoted as $Tx_{Pow}^{STA}$) based on the setting values of the AP TX Power set in the Common Info field of the Trigger frame (e.g., denoted as $Tx_{Pow}^{AP}(n)$, n=1, 2, ..., N) and the AP Tx Power index of the User Info field (e.g., denoted as i), according to following Equations 7 and 8.

[7]

$$PL_{DL}=Tx_{Pow}^{AP}(i)-DL_{RSSI} \quad \text{(Equation 7)}$$

[8]

$$Tx_{Pow}^{STA}=PL_{DL}+Target_{RSSI} \quad \text{(Equation 8)}$$

Thus, for example, in FIG. 8, an uplink transmission power based on the transmission power of AP 1 is configured for STA 1, and an uplink transmission power based on the combined value of the transmission powers of AP 1 and AP 2 is configured for STA 2, and an uplink transmission power based on the transmission power of AP 2 is configured for STA 3.

Thus, in Example 2. AP 100 uses a Trigger frame to indicate, to STA 200, information on a transmission power taking into consideration a coordinated communication mode for each STA 200 (i.e., transmission power of AP 100 taking into consideration MAP coordination processing per STA 200), for example. Further, STA 200 can recognize, based on the received Trigger frame, the transmission power of AP 100 taking into consideration the coordinated communication mode, for example. Even when a transmission power is different in each of a plurality of APs 100, for example, AP 100 can indicate information on the transmission power of AP 100 according to an uplink transmission method (e.g., coordinated communication mode) for each STA 200. Thus, even when the coordinated communication mode is applied, each STA 200 can improve the estimation accuracy of the path loss in downlink and correctly calculate (determine) the uplink transmission power, so that uplink throughput can be improved.

Here, with respect to the transmission power control parameter for each STA 200 included in the User Info field, the number of bits is likely to be smaller in an index value as in Example 2 compared to an offset value as in Example 1 (e.g., FIG. 15). Additionally, in a radio communication system, the number of STAs 200 is more likely larger than the number of APs 100 in general. Therefore, in Example 2, for example, the larger the number of STAs 200 configured (i.e., triggered) by the Trigger frame is, the more the signaling overhead can be reduced because the increase in User Info field size can be suppressed compared to Example 1.

Figure 18:
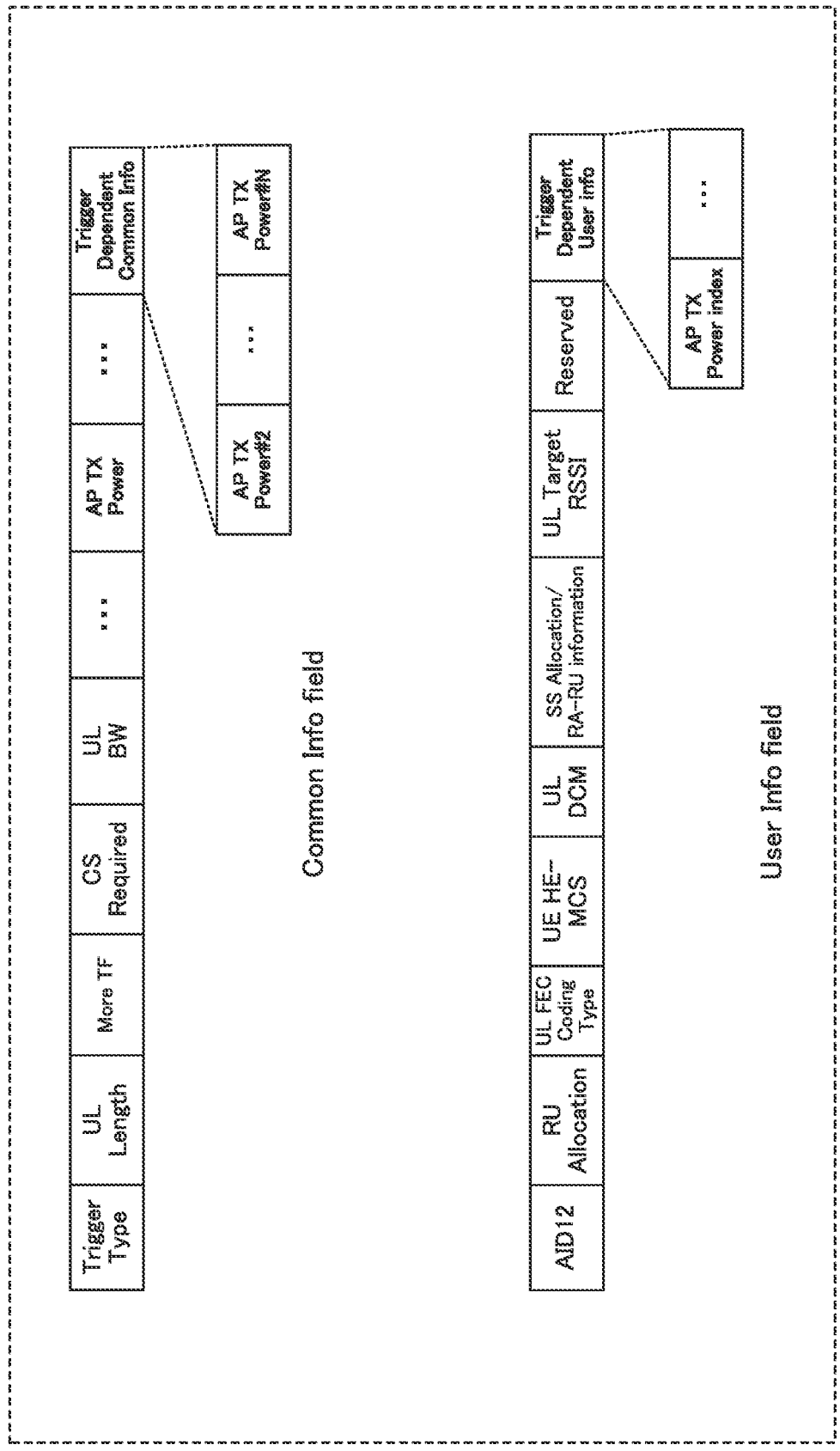
FIG. 18 illustrates other examples of the Common Info field and the User Info field according to Example 2.

Meanwhile, in a case where any of "Trigger format Switching Methods 4 to 6" described later is applied, "AP TX Power #2 to AP TX Power #N" of a Common Info field applied in the uplink coordinated communication mode may be arranged in, for example, a Trigger Dependent Common Info field as illustrated in FIG. 18. For example, AP TX Power #1 may be arranged in the AP TX Power field illustrated in FIG. 18. Similarly, "AP TX Power index" of the User Info field applied in the uplink coordinated communication mode may be arranged in a Trigger Dependent User Info field as illustrated in FIG. 18.

The Trigger frame format for the uplink coordinated communication and the calculation method for the uplink transmission power in STA 200 have been each described, thus far.

[Trigger Frame Format Switching Method]

Next, a description will be given of a switching method for a control signal format (i.e., format indication method to STA 200) between when the uplink coordinated communication is applied (Trigger frame format) and when the uplink coordinated communication is not applied. Incidentally, switching of the format may be replaced with selection of the format or determination or setting of the format.

For example, when at least one STA 200 of a plurality of STAs 200 to which uplink response signals are indicated by the Trigger frame performs the uplink coordinated communication, the control signal format when the uplink coordinated communication is applied may be applied.

On the other hand, for example, when each STA 200 of the plurality of STAs 200 to which the uplink response signals are indicated by the Trigger frame does not perform the uplink coordinated communication, the control signal format when the uplink coordinated communication is not applied may be applied.

For example, AP 100 and STA 200 may switch a format of the trigger frame based on any of Switching Method 1 to Switching Method 6 described below. For example, AP 100 and STA 200 may determine a Trigger frame format when the uplink coordinated communication control (e.g., uplink communication control coordinated between APs 100) is applied and a Trigger frame format when the uplink coordinated communication control is not performed, based on information on coordination of the multi-AP control (e.g., flag information or Trigger type to be described later). This can reduce the signaling overhead when the plurality of STAs 200 to which the uplink response signals are indicated by the Trigger frame does not perform the uplink coordinated communication.

<Switching Method 1>

In Switching Method 1, control information including flag information indicating whether to perform the uplink coordinated communication may be indicated from AP 100 to STA 200.

For example, as illustrated in FIG. 19, information (e.g., "UL multi AP flag") indicating whether to apply the uplink coordinated communication may be included in the Common Info field.

For example, when the UL multi AP flag is 1, a control signal format for STA 200 at the time of uplink coordinated communication may be applied as in Example 1 or Example 2. On the other hand, for example, when the UL multi AP flag is 0, the control signal format for STA 200 at the time of uplink coordinated communication may not be applied. For example, when the UL multi AP flag is 0, the same control signal format as in 11ax may be applied.

For example, upon receiving the Trigger frame, STA 200 may determine, based on the UL multi AP flag in the Common Info field, which format is applied to the Trigger frame (control signal).

<Switching Method 2>

In Switching Method 2, for example, AP 100 may indicate, in a signal field (e.g., Universal-SIG (U-SIG) or EHT-SIG) of the preamble of downlink PPDU including the Trigger frame, information indicating whether to apply the control signal format for STA 200 at the time of uplink coordinated communication (e.g., same UL multi AP flag as in Switching Method 1).

<Switching Method 3>

In Switching Method 3, for example, AP 100 may indicate, to STA 200, in a beacon or control information, the information indicating whether to apply the control signal format for STA 200 at the time of uplink coordinated communication (e.g., same UL multi AP flag as in Switching Method 1).

<Switching Method 4>

In Switching Method 4, for example, AP 100 may indicate, to STA 200, a control signal format by a "Trigger type" included in the Common Info field of the Trigger frame.

In Switching Method 4, for example, in a Trigger Type subfield value, a multi-AP application mode may be configured for at least one of modes such as Basic and Beamforming Report Poll (BFRP).

FIG. 20 illustrates an exemplary Trigger type according to Switching Method 4. FIG. 20 illustrates an exemplary relation between, for example, a Trigger type (e.g., Trigger frame variant) and a value (Trigger type subfield value) associated with the Trigger type indicated from AP 100 to STA 200 by the Trigger frame (e.g., Common Info field).

In the example illustrated in FIG. 20, in Trigger Type subfield value=8, a combination of the Basic mode and the multi-AP application mode is configured for the Trigger type. Incidentally, the configuration of the Trigger type illustrated in FIG. 20 is merely an example, a Trigger frame type different from the Basic and the multi-AP application mode may be indicated.

When the Trigger type is a type corresponding to the uplink coordinated communication (e.g., multi-AP application mode). AP 100 and STA 200 may configure the Trigger frame format when the uplink coordinated communication is applied.

Switching Method 4 eliminates the need to add new field or format for switching control for the control signal format, which suppresses the increase in specification changes.

<Switching Method 5>

In Switching Method 5, for example, AP 100 may indicate, to STA 200, a control signal format by a "Trigger type" included in the Common Info field of the Trigger frame.

Figure 21:
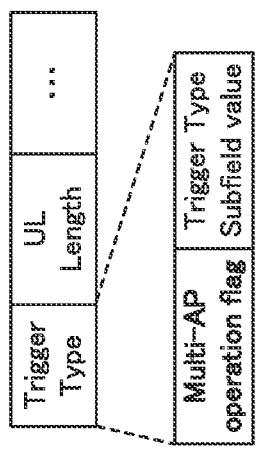
FIG. 21 illustrates an exemplary Trigger type according to Switching Method 5.
Figure 23:
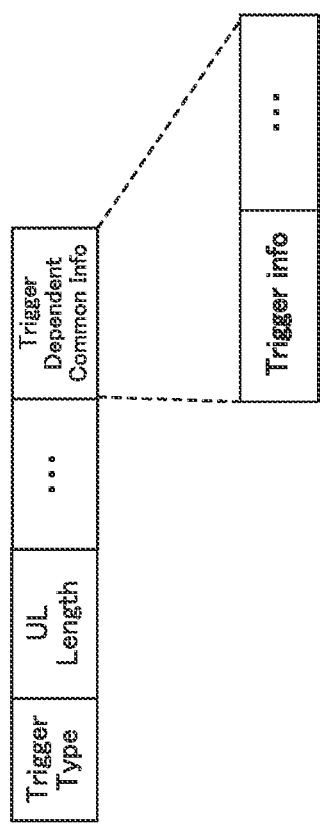
FIG. 23 illustrates an example of Trigger Dependent Common Info according to Switching Method 6.

FIG. 21 illustrates an exemplary Trigger type according to Switching Method 5.

As illustrated in FIG. 21, AP 100 may indicate, to STA 200, whether the Trigger format is for the uplink coordinated communication by, for example, a field different from the Trigger Type subfield value (e.g., Multi-AP operation flag (e.g., one bit)).

<Switching Method 6>

In Switching Method 6, for example, AP 100 may indicate, to STA 200, a control signal format by a "Trigger type" included in the Common Info field of the Trigger frame.

FIG. 22 illustrates an exemplary Trigger type according to Switching Method 6. FIG. 22 illustrates an exemplary relation between, for example, a Trigger type (e.g., Trigger frame variant) and a value (Trigger type subfield value) associated with the Trigger type indicated from AP 100 to STA 200 by the Trigger frame (e.g., Common Info field).

As illustrated in FIG. 22, in the "Trigger type", for example, it may be indicated that the uplink coordinated communication (multi-AP) is performed. In the example illustrated in FIG. 22, in a case of Trigger Type subfield value=8, it may be indicated that the uplink coordinated communication is performed.

Further, when application of the uplink coordinated communication is indicated by the Trigger type (e.g., when Trigger Type subfield value=8), the type of Trigger frame (e.g., Basic, BFRP or the like) may be indicated in, for example, a field different from the Trigger type (e.g., Trigger info in Trigger Dependent Common Info field). For example, the type of Trigger format to be indicated in the Trigger Info may be the same as the content illustrated in FIG. 5 (e.g., Trigger type in 11ax).

When the Trigger type is a type corresponding to the uplink coordinated communication (e.g., multi-AP application mode), for example, AP 100 and STA 200 may configure the Trigger frame format when the uplink coordinated communication is applied.

The switching methods of the Trigger frame format have been each described, thus far.

In the manner described above, in the present embodiment, AP 100 uses the Trigger frame to indicate, to STA 200, the parameter relating to the uplink coordinated communication when the uplink transmission power control is performed (e.g., parameter relating to transmission power of AP 100 per STA 200). Further, STA 200 controls a transmission power of an uplink response signal based on, for example, the parameter relating to the uplink transmission power control included in the received Trigger frame.

Thus, each STA 200 can calculate the transmission power of the uplink response signal based on the transmission power control parameter (transmission power of AP 100) per STA 200 included in the Trigger frame. Therefore, for example, even when a transmission power is different in each of a plurality of APs 100 in the AP group, it is possible to improve the estimation accuracy of the path loss in downlink and to improve the accuracy in transmission power control of the uplink response signal in each STA 200, so that throughput in uplink can be improved.

Hence, according to the present embodiment, it is possible to flexibly configure (control) an uplink transmission power for each STA 200 in the Multi-AP coordination.

Embodiment 2

In Embodiment 1, for example, a method has been described of indicating, for each STA, a transmission power of AP 100 taking into consideration the coordinated communication control in the Trigger frame. In the present embodiment, a method will be described of indicating, to STA 200, information on the transmission power of each AP 100 in an AP group (e.g., downlink transmission power of each AP 100 according to multi-AP control) in the Trigger frame.

Configuration examples of AP 100 and STA 200 according to the present embodiment may be the same as the configuration examples in Embodiment 1.

Hereinafter, a description will be given of a Trigger frame format for the uplink coordinated communication and an exemplary calculation method for an uplink transmission power according to the present embodiment. Note that, in the present embodiment, a Trigger frame format may be switched similarly in Embodiment 1 (e.g., any of Switching Method 1 to Switching Method 6).

Example 3

Figure 24:
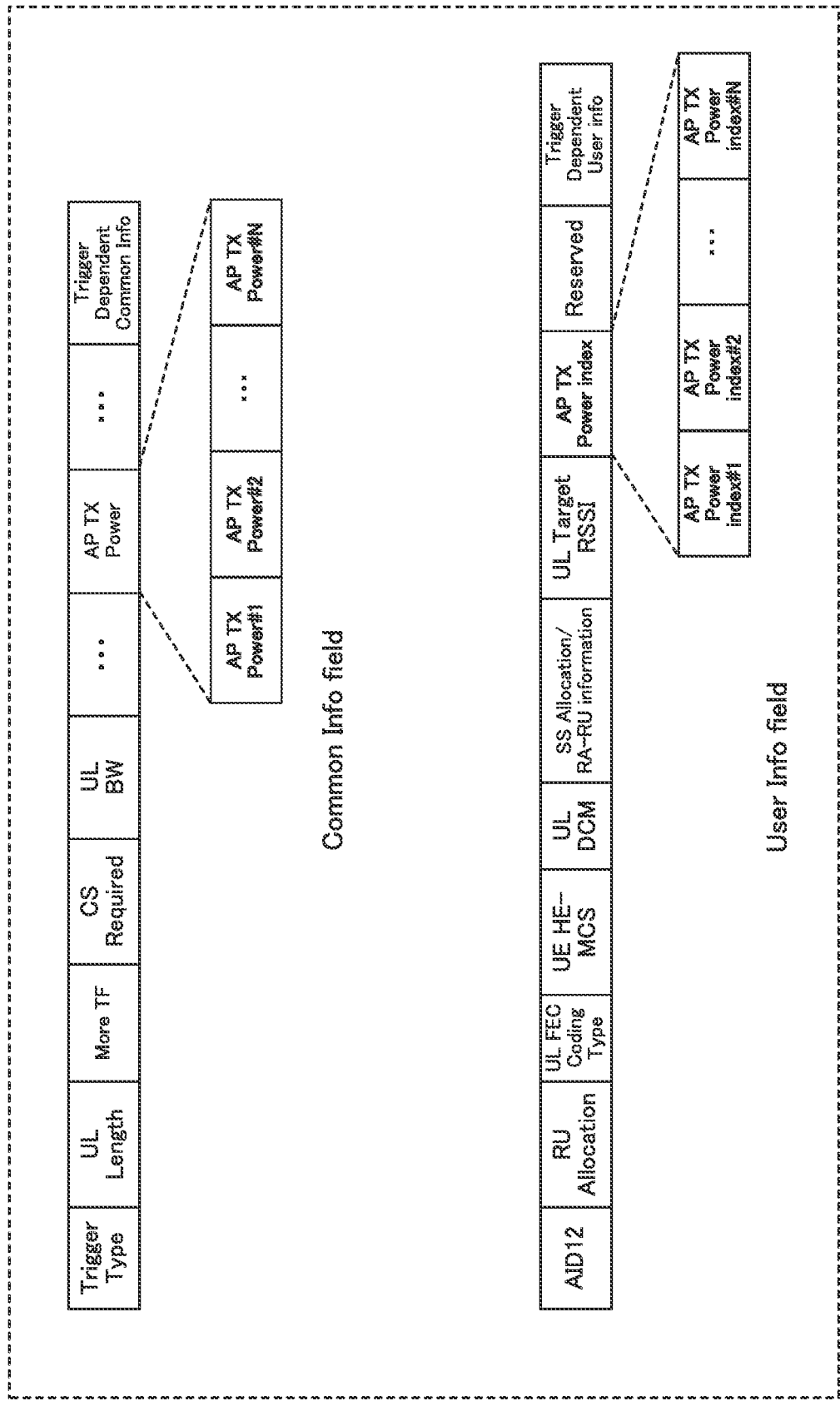
FIG. 24 illustrates examples of a Common Info field and a User Info field according to Example 3.

FIG. 24 illustrates examples of a Common info field and a User Info field of the Trigger frame in Example 3. Note that, the Common Info field and the User Info field of the Trigger frame may include a field different from the fields illustrated in FIG. 24. Further, part of the fields illustrated in FIG. 24 may not be included.

The common Info field illustrated in FIG. 24 (e.g., APTX Power field) may include, for example, the transmission power of each AP 100 of the AP group (e.g., AP Tx Power #1 to AP Tx Power #N).

Note that, for example, N may be a fixed value as in Example 2 of Embodiment 1 or may be indicated from AP 100 to STA 200 by a beacon or control information. Further, when the number of APs 100 in the AP group is less than N, an unused area may be present in the AP TX Power field.

For example, in the configuration example of the radio communication system illustrated in FIG. 8, in the Common Info field, the transmission power of AP 1 is configured for AP Tx Power #1, and the transmission power of AP 2 is configured for AP Tx Power #2.

Further, the User Info field illustrated in FIG. 24 may include, for example, "AP TX Power index" having the same number of bits (N) as the number N of transmission power per AP 100 configured for the Common Info field. The bits of the AP TX Power index (e.g., AP TX Power index #n, n=1, 2, . . . , N) may correspond to AP TX Power #1 to AP TX Power #N configured for Common Info field, respectively. In other words, the N bits of the AP TX Power index may be bitmap information corresponding to AP TX Power #1 to AP TX Power #N, respectively.

When a value of each bit of the AP TX Power index (e.g., AP TX Power index #n, n=1, 2, . . . , N) is 1, for example, STA 200 may calculate an uplink transmission power using AP TX Power configured for the corresponding Common Info field. Further, when a plurality of bits of the AP TX Power index is 1, for example, STA 200 may calculate an uplink transmission power by combining values of a plurality of AP TX Powers respectively corresponding to the plurality of bits. For example, when the Joint reception is applied, a plurality of AP TX Power indexes respectively corresponding to the plurality of APs 100 that receives uplink response signals from STAs 200 may be set to 1.

For example, STA 200 may calculate an uplink transmission power (e.g., denoted as $Tx_{Pow}^{STA}$) based on the setting values of the AP TX Power in the Common Info field of the Trigger frame (e.g., denoted as $Tx_{Pow}^{Ap}(n)$, (n=1, 2, . . . , N) and the AP Tx Power index of the User Info field (e.g., denoted as i), according to following Equations 9, 10, and 11.

[Equation 9]
$$PL_{DL} = Tx_{Pow}^{Ap} - DL_{RSSI} \quad [9]$$

[Equation 10]
$$Tx_{Pow}^{Ap} = 10 * \log 10 \left( \sum_{\substack{i=1, \\ Index(i) \neq 0}}^{N} 10^{\frac{Tx_{Pow}^{Ap}(i)}{10}} \right) \quad [10]$$

[Equation 11]
$$Tx_{Pow}^{STA} = PL_{DL} + Target_{RSSI} \quad [11]$$

As illustrated in Equation 9 and Equation 10, STA 200 estimates the path loss $PL_{DL}$, based on, for example, the value $Tx_{Pow}^{Ap}$ obtained by adding transmission power $Tx_{Pow}^{Ap}(i)$ of AP 100 where the value of AP Tx Power index (i) is set to 1.

For example, in the configuration example of the radio communication system illustrated in FIG. 8, a case will be described where the transmission power of AP 1 is configured for AP Tx Power #1, the transmission power of AP 2 is configured for AP Tx Power #2, and N is two bits. In this case, for example, the AP TX Power index of the User Info field of STA 1 may be set to "10," the AP TX Power index of the User Info field of STA 2 may be set to "11," and the AP TX Power index of the User Info field of STA 3 may be set to "01."

Thus, for example, in FIG. 8, STA 1 calculates an uplink transmission power based on the transmission power of AP 1, STA 2 calculates an uplink transmission power based on the combined value of transmission powers of AP 1 and AP 2, and STA 3 calculates an uplink transmission power based on the transmission power of AP 2.

Thus, in Example 3, for example, the transmission power of each AP 100 in the AP group is configured (i.e., indicated) by the Trigger frame. STA 200 can recognize, based on the received Trigger frame, the transmission power of AP 100 taking into consideration the coordinated communication mode, for example. Even when a transmission power is different in each of a plurality of APs 100, for example, STA 200 can recognize (select) information on the transmission power of AP 100 according to an uplink transmission method (e.g., coordinated communication mode) for each STA 200. Thus, even when the coordinated communication mode is applied, each STA 200 can improve the estimation accuracy of the path loss in downlink and correctly calculate (determine) the uplink transmission power, so that uplink throughput can be improved.

Figure 25:
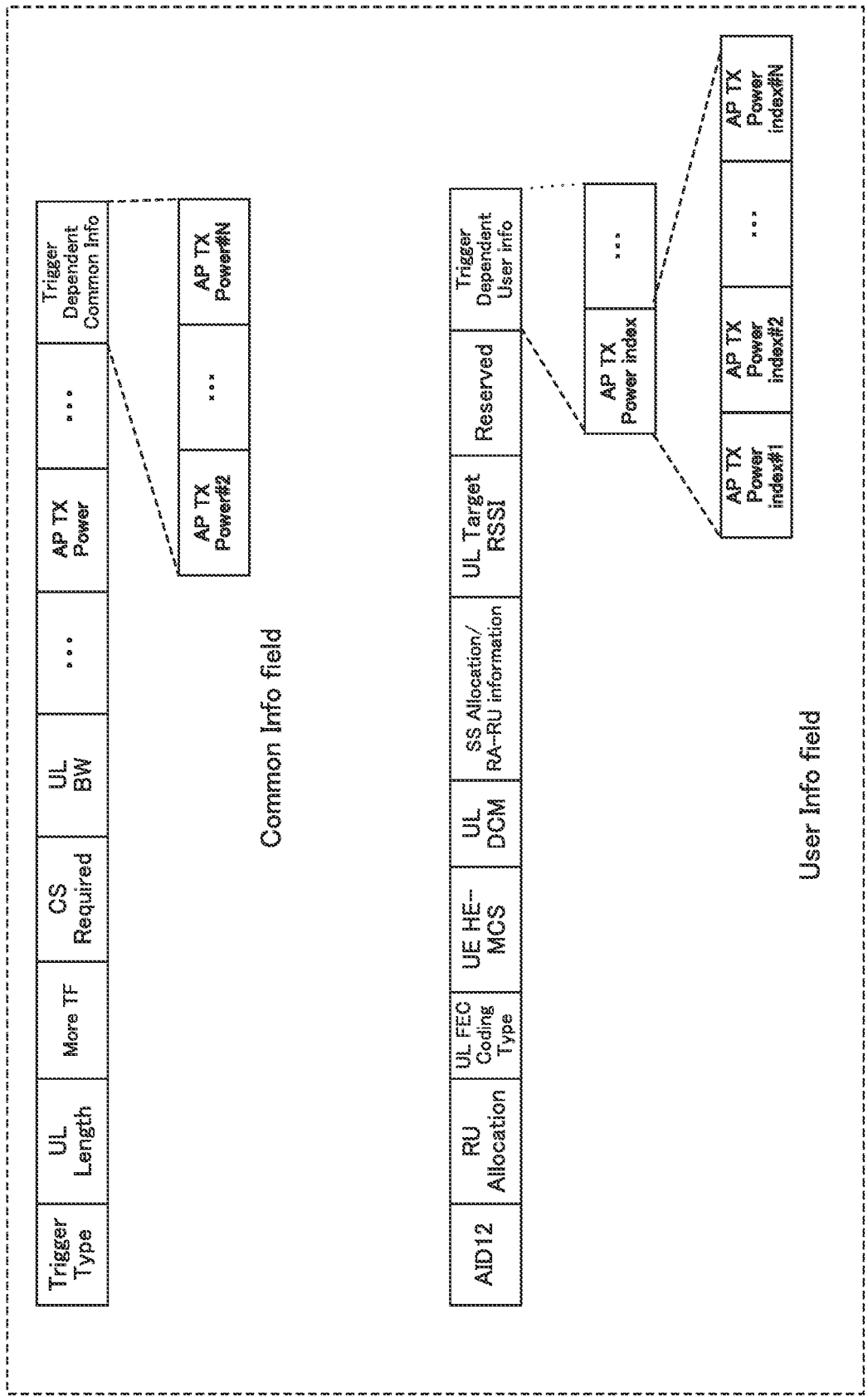
FIG. 25 illustrates other examples of the Common Info field and the User Info field according to Example 3.

Meanwhile, in a case where any of "Trigger format Switching Methods 4 to 6" described in Embodiment 1 is applied, "APTX Power #2 to APTX Power #N" of a Common Info field applied in the uplink coordinated communication mode may be arranged in, for example, a Trigger Dependent Common Info field as illustrated in FIG. 25. For example, AP TX Power #1 may be arranged in the AP TX Power field illustrated in FIG. 25. Similarly, "AP TX Power index" of the User Info field applied in the uplink coordinated communication mode may be arranged in a Trigger Dependent User Info field as illustrated in FIG. 25.

Example 4

In Example 4, for example, as in Example 3, in the Common Info field of the Trigger frame, the transmission power of each AP 100 of the AP group (e.g., AP Tx Power #1 to AP Tx Power #N) may be included.

Figure 26:
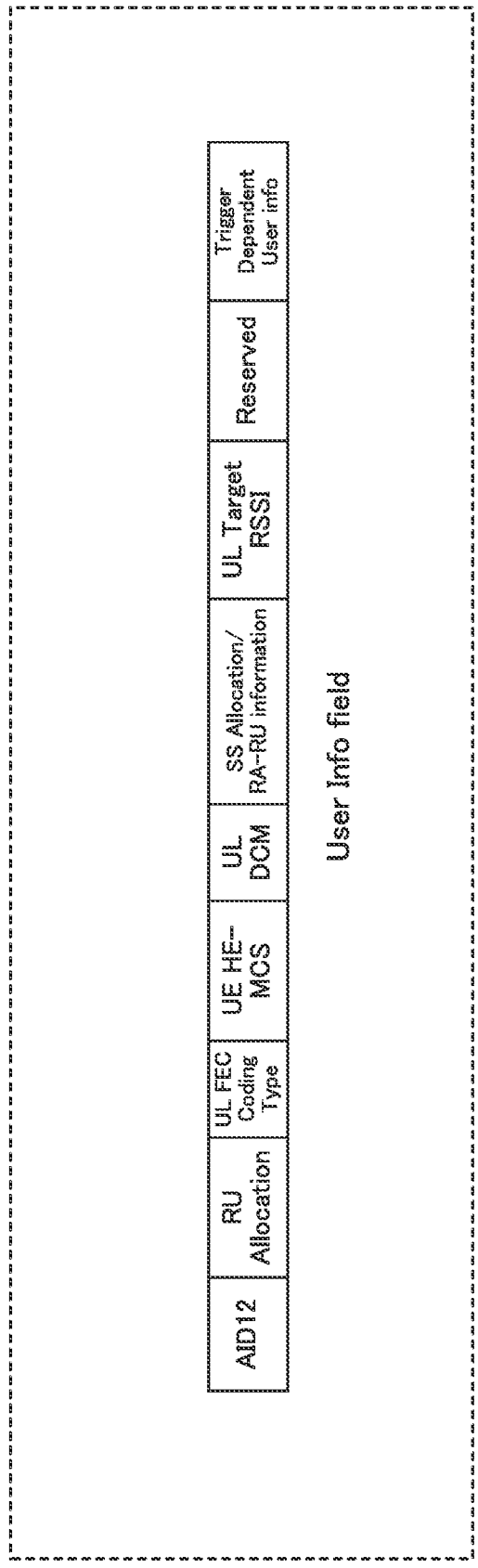
FIG. 26 illustrates an exemplary User Info field according to Example 4.

On the other hand, in Example 4, for example, in the User Info field of the Trigger frame, information on the transmission power of AP 100 used in calculation of the uplink transmission power (e.g., in Example 3. "APTX Power index") need not be indicated. For example, as illustrated in FIG. 26, the User Info field may be in a similar format as in 11ax.

STA 200 may select a transmission power to be used for the calculation of the uplink transmission power from among transmission powers of a plurality of APs 100 indicated in the Common Info field of the Trigger frame, for example.

STA 200 may estimate a path loss in communication with each AP 100 and then calculate an uplink transmission power for each transmission destination (AP 100) based on the transmission power of each AP 100 indicated in the Common Info field and the estimated path loss, for example.

Here, for estimation of the path loss in between with each AP 100, EHT-LTF between APs 100 of the AP group may be orthogonal. As a method of orthogonalizing EHT-LTF, for example, a method using different frequency resources or different codes (e.g., orthogonal codes and the like) may be applied.

Alternatively, STA 200 may estimate the path loss in between with each AP 100 without using orthogonal EHT-LTF, for example. By way of example, it is assumed that difference in the path loss between APs 100 that perform the coordinated communication is likely to be small (e.g., path loss difference is equal to or less than threshold value). Accordingly, STA 200 may assume, for example, there is no difference between the path losses respectively corresponding to the plurality of APs 100 (e.g., not more than threshold value) and then estimate the path loss estimated based on non-orthogonal EHT-LTF as the path loss of each AP 100.

STA 200 may determine, based on the calculated uplink transmission power per transmission destination (AP 100), the final uplink transmission power according to, for example, any of the following selection methods.

1. STA 200 may select the minimum uplink transmission power among the calculated uplink transmission power, for example. Selecting the minimum uplink transmission power can suppress the power consumption of STA 200.
2. STA 200 may select the maximum uplink transmission power among the calculated uplink transmission power, for example. Selecting the maximum uplink transmission power can improve the reception quality of an uplink response signal and thus improve uplink throughput.
3. STA 200 may set a mean value of the calculated uplink transmission power for the transmission destination (AP 100) to the uplink transmission power, for example. This can suppress the power consumption of STA 200, and the reception quality of an uplink response signal can be thus improved, for example.

Note that, the selection method for the uplink transmission power is not limited to these. For example, a weighted mean value for the calculated uplink transmission power for the transmission destination (AP 100) may be set to the uplink transmission power.

Thus, in Example 4, for example, the transmission power of each AP 100 in the AP group is configured (i.e., indicated) by the Trigger frame. STA 200 can recognize, based on the received Trigger frame, the transmission power of AP 100 taking into consideration the coordinated communication mode, for example. Even when a transmission power is different in each of a plurality of APs 100, for example, STA 200 can recognize (select) information on the transmission power of AP 100 according to an uplink transmission method (e.g., coordinated communication mode) for each STA 200. Thus, even when the coordinated communication mode is applied, each STA 200 can improve the estimation accuracy of the path loss in downlink and correctly calculate (determine) the uplink transmission power, so that uplink throughput can be improved.

Further, in Example 4, for example, in STA 200, since AP 100 that is a transmission destination can be dynamically switched (e.g., Diversity reception), the reception quality of an uplink response signal can be improved or the power consumption can be reduced.

In the manner described above, in the present embodiment, AP 100 uses the Trigger frame to indicate, to STA 200, the parameter relating to the uplink coordinated communication taking into consideration the uplink transmission power control (e.g., parameter relating to uplink transmission power control for each of a plurality of STAs 200). Further, STA 200 controls a transmission power of an uplink response signal based on, for example, the parameter relating to the transmission power control included in the received Trigger frame.

Thus, each STA 200 can calculate the transmission power of the uplink response signal based on the transmission power control parameter (transmission power of AP 100) per AP 100 included in the Trigger frame. Therefore, for example, even when a transmission power is different in each of a plurality of APs 100 in the AP group, it is possible to improve the estimation accuracy of the path loss in downlink, so that the accuracy in transmission power control of the uplink response signal can be improved in each STA 200 and throughput in uplink can be thereby improved.

Hence, according to the present embodiment, it is possible to flexibly configure (control) an uplink transmission power for each STA 200 in the Multi-AP coordination.

Embodiment 3

In Embodiment 1 and Embodiment 2, the indication methods related to transmission powers of APs for the uplink coordinated communication have been described. In the present embodiment, an indication method relating to a target RSSI in uplink (e.g., target received signal strength) will be described.

Configuration examples of AP 100 and STA 200 according to the present embodiment may be the same as the configuration examples in Embodiment 1. For example, an operation of STA-directed control signal generator 102 of AP 100 is different from that in Embodiment 1 or Embodiment 2, an operation example will be described below.

STA-directed control signal generator 102 may generate a control signal for STA 200 based on a resource allocation result to each STA 200, a transmission power control parameter input from configurator 101 (e.g., AP TX Power or target RSSI), or information input from received signal demodulator/decoder 106, for example.

The control signal for STA 200 may include, for example, in addition to time- and frequency-resource information (e.g., RU allocation information, TXOP, LENGTH, and the like for uplink coordinated communication), at least one of the transmission power control parameter (e.g., transmission power, target RSSI, or the like of AP 100), information on generation of the trigger frame (e.g., UL MCS, GI, and LTF mode), a Trigger type for indicating the type of control signal, and terminal identification information (e.g., AID).

Further, in the present embodiment, for example, by adjusting a target RSSI, a dynamic range of the target RSSI may be increased, as compared to the case of not applying the uplink coordinated communication. Therefore, in the present embodiment, when the uplink coordinated communication is applied, a format of a target RSSI field may be changed, as compared to the case of not applying the uplink coordinated communication (example will be described later).

STA-directed control signal generator 102 outputs the generated control signal to transmission signal generator 104, for example.

[Adjusting Method for Target RSSI]

Hereinafter, an exemplary adjusting method for a target RSSI in the present embodiment will be described.

AP 100 may adjust the "target RSSI" in a User Info field based on, for example, "AP TX Power" configured for a Common Info field of a Trigger frame, the transmission power of each AP 100 in an AP group, and a coordinated communication mode to be applied to each STA 200.

For example, AP 100 may adjust the target RSSI according to following Equation 12.

[12]

$$\text{Target}_{RSSI\_adj}(u) = \text{Target}_{RSSI}(u) - (\text{Tx}_{Pow}^{Ap} - \text{Tx}_{Pow}^{Ap(u)}) \quad \text{(Equation 12)}$$

In Equation 12, $\text{Target}_{RSSI\_adj}(u)$ represents a target RSSI [dBm] after adjustment with respect to STA #u, and $\text{Target}_{RSSI}(u)$ represents a target RSSI [dBm] before adjustment with respect to STA #u. The target RSSI before adjustment may be, for example, a target RSSI configured by the same method as in Embodiment 1 or Embodiment 2.

Further, in Equation 12, $\text{Tx}_{Pow}^{Ap}$ represents AP TX Power [dBm] configured for the Common Info field, and $\text{Tx}_{Pow}^{Ap(u)}$ represents a transmission power [dBm] of at least one AP 100 that receives an uplink response signal transmitted from STA #u.

For example, a transmission power of the sharing AP may be configured for the $\text{Tx}_{Pow}^{Ap}$. A value of the $\text{Tx}_{Pow}^{Ap}$ is not limited to the transmission power of the sharing AP and may be the mean transmission power in an AP group performing the coordinated communication or a transmission power of any AP 100 in the AP group (e.g., maximum or minimum transmission power).

Further, for example, the transmission power of the association AP may be configured for $\text{Tx}_{Pow}^{Ap(u)}$ for STA 200 not performing the uplink coordinated communication. Meanwhile, for example, a transmission power of AP 100 that receives the uplink response signal may be configured for $\text{Tx}_{Pow}^{Ap(u)}$ for STA 200 where the coordinated communication mode is the Diversity reception. On the other hand, for example, a total value of transmission powers of a plurality of APs 100 that receives uplink response signals may be configured for $\text{Tx}_{Pow}^{Ap(u)}$ for STA 200 where the coordinated communication mode is the joint reception.

As illustrated in Equation 12, for example, transmission powers of one or more APs 100 performing the coordinated communication is reflected on the target RSSI after adjustment ($\text{Target}_{RSSI\_adj}(u)$). Therefore, STA 200, based on the target RSSI indicated by the Trigger frame, can calculate, for example, an uplink transmission power corresponding to the coordinated communication mode configured for each STA 200.

[Target RSSI Field Format]

Examples of target RSSI fields formats will be described.

For example, even when the dynamic range of the target RSSI is increased by adjusting the target RSSI, a format may be applied which allows a desired target RSSI to be indicated in the User Info field of the Trigger frame.

For example, as described below, configuring (or changing) the target RSSI field format enables AP 100 to indicate the desired target RSSI to STA 200, and thus, the accuracy of the uplink transmission power control in STA 200 can be improved.

Note that, in the present embodiment, a Trigger frame format may be switched similarly in Embodiment 1 (e.g., any of Switching Method 1 to Switching Method 6).

<Target RSSI Format 1>

For example, the number of bits corresponding to a setting value of the target RSSI in the target RSSI field may be increased. In one example, in 11ax, the number of bits in the target RSSI field is seven bits. In the present embodiment, for example, the number of bits may be larger than seven bits (e.g., eight bits) taking into consideration an increase in the dynamic range of the Target RSSI due to the uplink coordinated communication.

In other words, the bit size corresponding to information on the target RSSI may vary between the case of performing the uplink coordinated communication control (e.g., uplink communication control coordinated between APs 100) and the case of not performing the uplink coordinated communication control.

Further, for example, part of the Reserve area configured for the target RSSI field (e.g., table) in 11ax illustrated in FIG. 4 may be used as an increment of the bits corresponding to the setting value of the target RSSI. In this case, the number of bits in the target RSSI field need not be increased.

<Target RSSI Format 2>

FIG. 27 illustrates an example of a target RSSI field (e.g., table). FIG. 20 illustrates an exemplary relation between, for example, a value of a target RSSI (or candidate value, e.g., range within −155 dBm to 25 dBm) and an index value (e.g., any of 0 to 127) indicated from AP 100 to STA 200 by the Trigger frame (e.g., User Info field).

As illustrated in FIG. 27, for example, a range of the configurable target RSSI may be enlarged by increasing a step size of the target RSSI compared to the setting values illustrated in FIG. 4, (e.g., increasing maximum value while reducing minimum value). For example, the step size of the target RSSI is 1 dB-step in 11ax, whereas 2 dB-step in FIG. 27.

In other words, a difference (i.e., step size) between target RSSIs respectively mapped to the two indexes associated with candidate values for the target RSSI may vary between the case of performing the uplink coordinated communication control (e.g., uplink communication control coordinated between APs 100) and the case of not performing the uplink coordinated communication control.

Incidentally, FIG. 27 is merely an example, and, for example, either range of the maximum value or the minimum value may be enlarged and the step size may be different from 2 dB-step size (e.g., 1.5 dB).

Further, with respect to whether to apply "target RSSI Format 2," for example, STA 200 may switch based on the setting value of the "AID12" field in the User Info field. For example, when AID that is separately secured for the coordinated communication (e.g., AID for coordinated communication) is indicated, STA 200 may apply a target RSSI table to which the RSSI step size is added (e.g., FIG. 27), and when AID different from the AID for the coordinated communication is indicated, STA 200 may use a target RSSI table in which the RSSI step size is 1 dB (e.g., FIG. 4). That is, STA 200 may change the step size or range (maximum value and/or minimum value) of the target RSSI based on, for example, the AID indicated by the Trigger frame.

Incidentally, the AID for the coordinated communication may be, for example, any of AIDs of 2047 to 4094 which is reserved in 11ax or may be AID indicated by a beacon or control information.

The examples of the target RSSI formats have been each described, thus far.

In the present embodiment, for example, the indication method for the target RSSI taking into consideration the uplink coordinated communication control makes it possible to improve the accuracy of the uplink transmission power control in the uplink coordinated communication, as in Embodiment 1 and Embodiment 2. Further, according to the present embodiment, for example, with respect to the indication method for the control signal in 11ax, it is sufficient to change the indication method for the target RSSI, which can suppress specification changes.

Embodiment 4

Configuration examples of AP 100 and STA 200 according to the present embodiment may be the same as the configuration examples in Embodiment 1.

In Embodiments 1 to 3, methods have been described in which a plurality of APs 100 controls the uplink transmission power for the uplink coordinated communication in one Trigger frame. In the present embodiment, a method will be described in which each AP 100 generates a Trigger frame per AP 100 (i.e., Trigger frame in units of APs 100) and controls the uplink transmission power for the uplink coordinated communication by a plurality of Trigger frames.

Incidentally, an operation of STA-directed control signal generator 102 of AP 100 is different from that in other Embodiments, an operation example will be described below.

STA-directed control signal generator 102 may generate a control signal for STA 200 based on a resource allocation result to each STA 200, a transmission power control parameter input from configurator 101 (e.g., AP TX Power or target RSSI), or information input from received signal demodulator/decoder 106, for example.

The control signal for STA 200 may include, for example, in addition to time- and frequency-resource information (e.g., RU allocation information, TXOP, LENGTH, and the like for uplink coordinated communication), at least one of the transmission power control parameter (e.g., transmission power, target RSSI, or the like of AP 100), information on generation of the trigger frame (e.g., UL MCS, GI, and LTF mode), a Trigger type for indicating the type of control signal, and terminal identification information (e.g., AID).

In the present embodiment, STA-directed control signal generator 102 may individually generate as many Trigger frames as the number of APs in the AP group, for example. In other words, STA-directed control signal generator 102 may generate a Trigger frame in units of APs 100 in the AP group, for example. A configuration example of the Trigger frame will be described later.

STA-directed control signal generator 102 outputs the generated plurality of control signals to transmission signal generator 104, for example.

Trigger Frame Configuration Example

Hereinafter, a configuration example of a Trigger frame according to the present embodiment will be described.

Configuration Example 1

In Configuration Example 1, for example, a User Info field of a Trigger frame corresponding to each AP 100 may include information on STA 200 from which an uplink response signal is to be received by corresponding AP 100 (i.e., STA 200 that configure corresponding AP 100 to transmission destination).

Further, in Configuration Example 1, for example, when the Joint reception is applied, the same AID may be configured in each of Trigger frames of the plurality of APs 100 that receives the uplink response.

Figure 28:
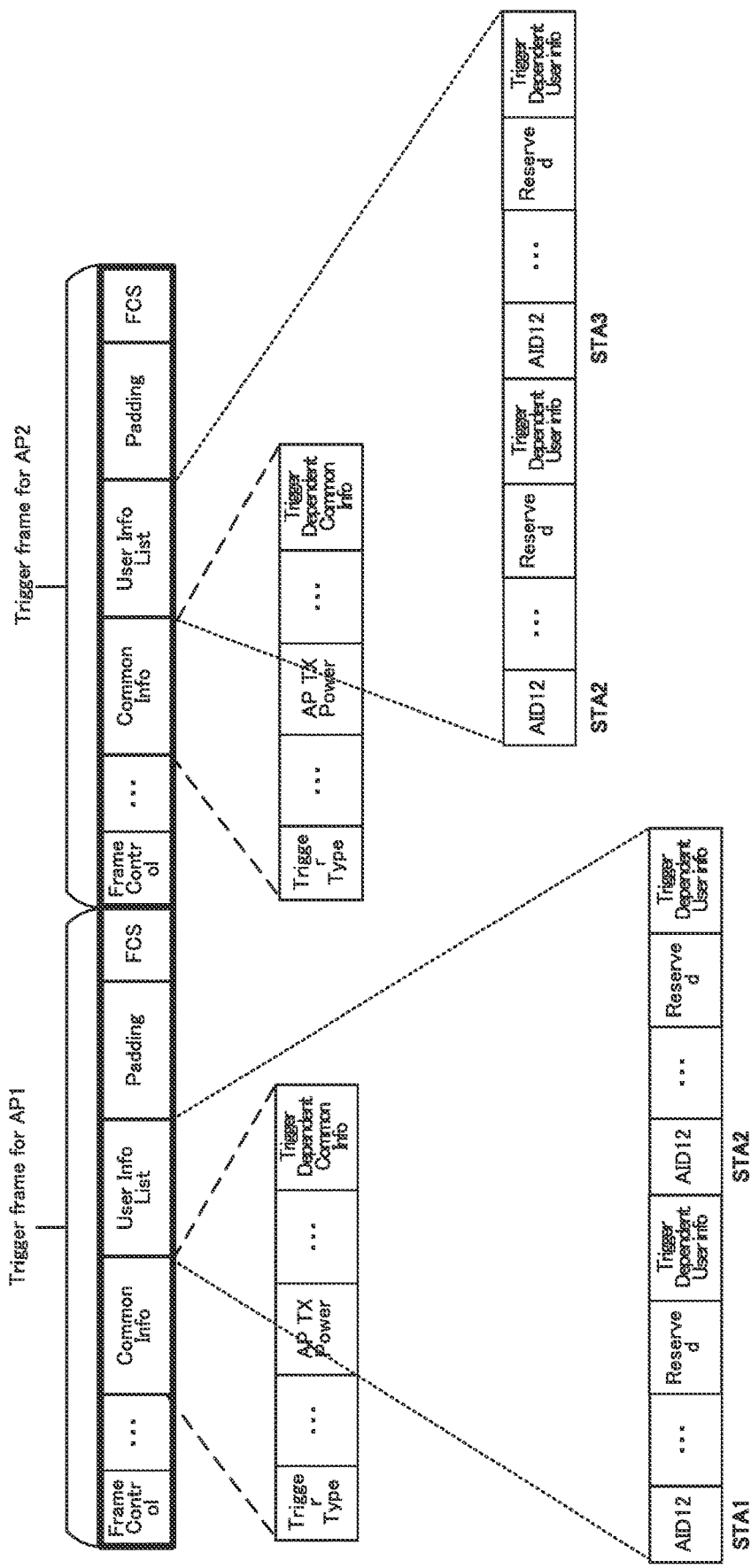
FIG. 28 illustrates a configuration example of a Trigger frame.

For example, the configuration example of the radio communication system illustrated in FIG. 8 will be described. FIG. 28 illustrates a configuration example of a Trigger frame according to Configuration Example 1. As illustrated in FIG. 28, a Trigger frame may be generated for each of APs 100 (e.g., AP 1 and AP 2). In the example of FIG. 8, a Trigger frame for AP 1 may include User Info fields for STA 1 and STA 2, respectively. Further, in the example of FIG. 8, a Trigger frame for AP 1 may include User Info fields for STA 1 and STA 3, respectively.

For example, STA 200 may decode a plurality of Trigger frames in the received downlink PPDU (e.g., EHT PPDU or MU PPDU) and perform the uplink transmission power control based on a target RSSI configured in the User Info field in which the AID addressed to STA 200 is included and AP TX Power included in the Common Info field of the Trigger frame in which the AID addressed to STA 200 is included.

For example, in the example of FIG. 28, STA 1 may calculate an uplink transmission power based on the target RSSI configured for the User Info field for STA 1 included in the Trigger frame for AP 1 and the AP TX Power configured for the Common Info field of the Trigger frame for AP 1. In addition, STA 3 may calculate an uplink transmission power based on the target RSSI configured for the User info field for STA 3 included in the Trigger frame for AP 2 and the AP TX Power configured for the Common Info field of the Trigger frame for AP 2.

Further, for example, in the embodiment of FIG. 28, STA 2 calculate an uplink transmission power based on the target RSSIs configured for the User Info fields for STA 2 included in the respective Trigger frames for AP 1 and AP 2 and the AP TX Powers configured for the respective Common Info fields of the Trigger frames for AP 1 and AP 2.

Incidentally, when the same AID (e.g., AID of STA 2 illustrated in FIG. 28) is included in the plurality of Trigger frames, STA 200 corresponding to the AID may calculate an uplink transmission power by using a value obtained by adding AP TX Power of each of the Trigger frames as the transmission power of AP for example.

Further, when the same AID is included in the plurality of Trigger frames, STA 200 corresponding to the AID may select, for example, a mean value of target RSSIs, the maximum value or the minimum value of the target RSSIs in a case where a target RSSI configured for each User Info field is different from each other.

According to Configuration Example 1, STA 200 can, for example, recognize the transmission power of each AP 100 and perform the uplink transmission power control taking into consideration the coordinated communication mode, so that uplink throughput can be improved.

Configuration Example 2

In Configuration Example 2, the indication method for the transmission power control parameter when the Joint transmission is applied is different from that in Configuration Example 1.

For example, in Configuration Example 2, information (e.g., "multi-AP mode" field) indicating whether a coordinated communication mode (e.g., Joint transmission) is applied may be configured for the User Info field. Further, in Configuration Example 2, for example, a plurality of AIDs (e.g., same AID) need not to be indicated in the Trigger frame corresponding to each of the plurality of APs 100. For example, the User Info field corresponding to each of the plurality of AIDs may be configured in any one of Trigger frames corresponding to the plurality of APs 100.

Figure 29:
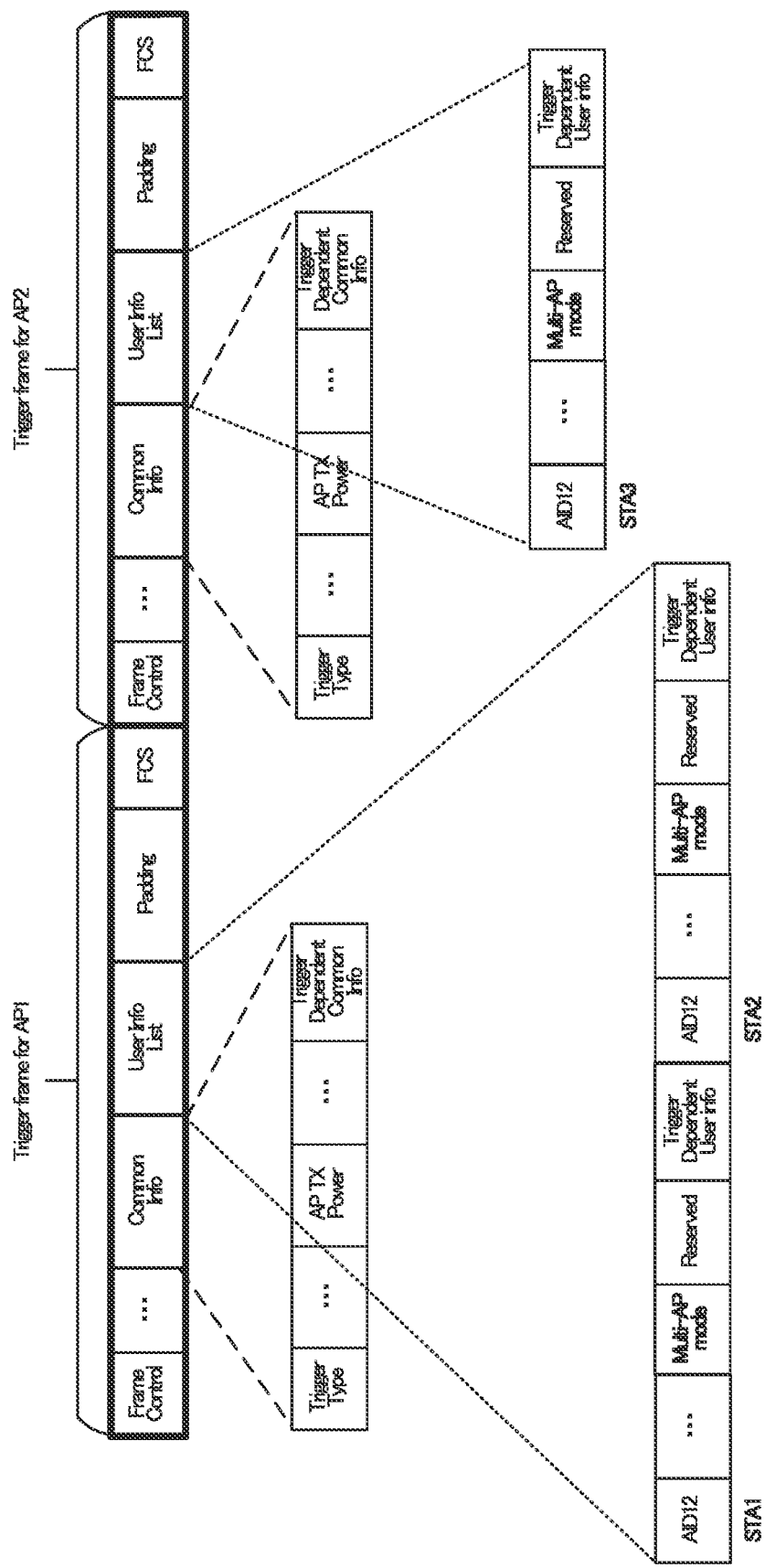
FIG. 29 illustrates another configuration example of the Trigger frame.

For example, the configuration example of the radio communication system illustrated in FIG. 8 will be described. FIG. 29 illustrates a configuration example of a Trigger frame according to Configuration Example 2. As illustrated in FIG. 29, a Trigger frame may be generated for each of APs 100 (e.g., AP 1 and AP 2). In the example of FIG. 8, a Trigger frame for AP 1 may include User Info fields for STA 1 and STA 2, respectively. Further, in the example of FIG. 8, a Trigger frame for AP 2 may include User Info fields for STA 3, respectively.

For example, STA 200 may calculate an uplink transmission power by using a value obtained by adding AP TX Powers of the plurality of Trigger frames included in PPDU as the transmission power of AP, in a case where the Joint reception is indicated in a multi-AP mode field included in the User Info field for this STA 200. On the other hand, STA 200 may calculate uplink transmission based on the AP TX Power configured for the Common Info field of the Trigger frame in which the AID of this STA 200 is included in the User Info field, in a case where a mode different from the Joint reception (e.g., no coordinated communication or diversity reception) is indicated in the multi-AP mode field included in the User Info field for this STA 200.

In the example of FIG. 29, a mode different from the Joint reception is indicated to the multi-AP mode field for STA 1. Hence, STA 1 may calculate an uplink transmission power based on the AP TX Power configured for the Common Info field of the Trigger frame for AP 1 including the User Info field for STA 1. In the example of FIG. 29, a mode different from the Joint reception is indicated to the multi-AP mode field for STA 3. Hence, STA 3 may calculate an uplink transmission power based on the AP TX Power configured for the Common Info field of the Trigger frame for AP 2 including the User Info field for STA 3.

Further, in the example of FIG. 29, the Joint transmission is indicated in the multi-AP mode field for STA 2. Therefore, STA 2 may calculate an uplink transmission power based on an added value of AP TX Powers configured for the Common Info fields of the Trigger frames for the plurality of APs (AP 1 and AP 2).

According to Configuration Example 2, STA 200 can recognize the transmission power of each AP 100 and perform the uplink transmission power control taking into consideration the coordinated communication mode, so that uplink throughput can be improved. Further, in Configuration Example 2, the User Info field corresponding to the same AID is not configured in the plurality of Trigger frames; thus, as the number of STAs 200 performing the Joint reception increases, signaling overhead can be reduced as compared to Configuration Example 1, for example.

Embodiment 5

Configuration examples of AP 100 and STA 200 according to the present embodiment may be the same as the configuration examples in Embodiment 1.

In Embodiment 4, the configuration has been described in which a plurality of APs 100 transmits one downlink PPDU while including a plurality of Trigger frames for each AP 100 therein. In the present embodiment, for example, the plurality of APs 100 transmits downlink PPDUs each including a Trigger frame corresponding to AP 100 while allocating them to frequency resources different from each other.

Incidentally, an operation of STA-directed control signal generator 102 of AP 100 is different from that in other Embodiments, an operation example will be described below.

STA-directed control signal generator 102 may generate a control signal for STA 200 based on a resource allocation result to each STA 200, a transmission power control parameter input from configurator 101 (e.g., AP TX Power or target RSSI), or information input from received signal demodulator/decoder 106, for example.

The control signal for STA 200 may include, for example, in addition to time- and frequency-resource information (e.g., RU allocation information, TXOP, LENGTH, and the like for uplink coordinated communication), at least one of the transmission power control parameter (e.g., transmission power, target RSSI, or the like of AP 100), information on generation of the trigger frame (e.g., UL MCS, GI, and LTF mode), a Trigger type for indicating the type of control signal, and terminal identification information (e.g., AID).

Further, in the present embodiment, STA-directed control signal generator 102 generates, for example, a control signal for STA 200 associated with each AP 100.

[Resource Allocation Method]

An example of a resource allocation method for a control signal will be described below.

Each AP 100 in the AP group may assign downlink PPDU including the Trigger frame in frequency resources different from each other, for example.

Figure 30:
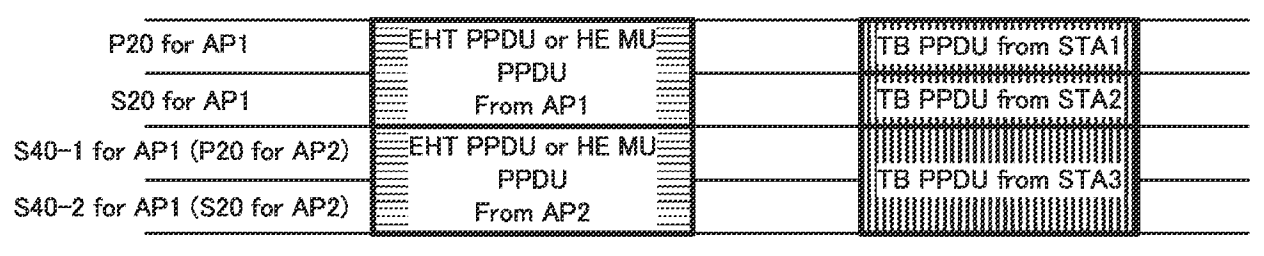

FIG. 30 illustrates an example of resource allocation for PPDU including a Trigger frame (e.g., EHT PPDU or MU PPDU). The example illustrated in FIG. 30 indicates the resource allocation in the configuration example of the radio communication system illustrated in FIG. 8.

For example, in FIG. 30, AP 1 may transmit the downlink PPDU including the Trigger frame while assigning it to a 40-MHz channel including a primary channel for AP 1 (P20 for AP 1). Similarly, AP 2 may transmit the downlink PPDU including the Trigger frame while assigning it to a 40-MHz channel including a primary channel for AP 2 (P20 for AP 2). As a result, STA 200 receives the Trigger frame from AP 1 and the Trigger frame from AP 2 in frequency resources different from each other, for example.

The configuration of the Trigger frame when performing the coordinated communication may be, for example, the same as any of those in Configuration Example 1 and Configuration Example 2 of Embodiment 4. For example, when Configuration Example 1 is applied, the User Info field in which the AID of STA 200 that applies the joint reception to each Trigger frame from AP 100 is configured may be included. On the other hand, when Configuration Example 2 is applied, the "multi-AP mode" field may be arranged to the User Info field of the Trigger frame from each AP 100.

In addition, in the present embodiment, as described in Example 4 of Embodiment 2, for example, in STA 200, the transmission power of AP 100 used for calculation of the transmission power may be determined based on transmission powers of the plurality of APs 100 indicated by the plurality of Trigger frames. For example, in the present embodiment, as illustrated in FIG. 30, since the downlink PPDUs including the Trigger frames of APs 100 are each transmitted in different frequency resources, STA 200 can improve the signal estimation accuracy in downlink from each AP 100 and improve the estimation accuracy of the path loss of each AP.

According to the present embodiment, STA 200 can, for example, recognize the transmission power of each AP 100 and perform the uplink transmission power control taking into consideration the coordinated communication mode, so that uplink throughput can be improved.

Incidentally, Embodiment 4 and Embodiment 5 may be combined. For example, downlink PPDUs transmitted in some frequency resources may include Trigger frames of a plurality of APs 100, and a downlink PPDU transmitted in another frequency resource may include the Trigger frame of one AP 100.

The embodiments of the present disclosure have been each described thus far.

Other Embodiments

In the embodiments described above, configuration examples based on a format of a control signal in 11ax have been described as an example, but the format to which an exemplary embodiment of the present disclosure is applied is not limited to the format in 11ax.

Further, the formats indicated in the embodiments described above are exemplary, and the present disclosure is not limited thereto. For example, one or some of the fields and subfields included in the formats indicated in the embodiments described above may be omitted, a field(s) and/or a subfield(s) that notifies/notify another information may be added, and/or an order(s) of arrangement of fields and subfields may be changed. Further, the terms "field" and "subfield" may be interchanged.

Further, the names of the pieces of information and the fields indicated in the embodiments described above are exemplary and the present disclosure is not limited to these.

In each of above Embodiments, the uplink communication has been described, but the present disclosure is not limited to this and may be applied to downlink communication.

Further, in each of above Embodiments, a case has been described where a plurality of STAs 200 is included in the radio communication system, but the number of STAs 200 included in the radio communication system may be one. For example, the Trigger frame may indicate control information on an uplink signal for one STA 200.

In addition, the term, such as "part" or "portion" or the term ending with a suffix, such as "-er" "-or" or "-ar" in the above-described embodiment may be replaced with another term, such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers. RF modulators/demodulators and the like, and one or more antennas. Some non-limiting examples of such a communication apparatus include a phone (e.g. cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

An access point according to an exemplary embodiment of the present disclosure includes: control circuitry, which, in operation, generates a parameter relating to uplink transmission power control, based on information on transmission power control received from another access point; and transmission circuitry, which, in operation, transmits a control signal including the parameter.

In an exemplary embodiment of the present disclosure, the parameter includes information on a downlink transmission power that is determined, for each of a plurality of terminals, corresponding to a type of uplink communication control.

In an exemplary embodiment of the present disclosure, the control signal includes common information including information common to the plurality of terminals and terminal-specific information specific to each of the plurality of terminals, and in which the common information includes a common value relating to the downlink transmission power and common to the plurality of terminals, and the terminal-specific information includes an offset value for the common value.

In an exemplary embodiment of the present disclosure, the control signal includes common information including information common to the plurality of terminals and terminal-specific information specific to each of the plurality of terminals, and in which the common information includes information on a plurality of the downlink transmission powers, and the terminal-specific information includes an index associated with the plurality of downlink transmission powers.

In an exemplary embodiment of the present disclosure, information on a downlink transmission power for each access point relating to uplink communication control is included.

In an exemplary embodiment of the present disclosure, the parameter includes information on a target received signal strength of the access point in uplink communication control, and in which a bit size corresponding to the information on the target received signal strength varies between a case of performing the uplink communication control in coordination between the access point and the other access point and a case of not performing the uplink communication control in coordination between the access point and the other access point.

In an exemplary embodiment of the present disclosure, the parameter includes an index associated with a candidate value for a target received signal strength of the access point in uplink communication control, and in which a difference between a plurality of the target received signal strengths respectively associated with a first index and a second index varies between a case of performing the uplink communication control in coordination between the access point and the other access point and a case of not performing the uplink communication control in coordination between the access point and the other access point.

In an exemplary embodiment of the present disclosure, based on information on coordination of the uplink communication control, the control circuitry determines a format of the control signal as a first format in a case where the uplink communication control in coordination between the base stations is performed, and determines the format of the control signal as a second format in a case where the uplink communication control in coordination between the base stations is not performed.

In an exemplary embodiment of the present disclosure, the information on the coordination of the uplink communication control includes flag information indicating whether to perform the coordination.

In an exemplary embodiment of the present disclosure, the flag information is included in any one of common information including information common to a plurality of terminals, a signal field in a data unit including the control signal, and a beacon.

In an exemplary embodiment of the present disclosure, the information on the coordination of the uplink communication control includes information on a type of the control signal, and the control circuitry configures the first format in a case where a type of the control signal is a type corresponding to the coordination.

In an exemplary embodiment of the present disclosure, the control circuitry generates the control signal for each of a plurality of the access points.

A terminal according to an exemplary embodiment of the present disclosure includes: reception circuitry, which, in operation, receives a control signal including a parameter that relates to control of an uplink transmission power and is generated based on information on transmission power control received from another access point; and control circuitry, which, in operation, controls the uplink transmission power based on the parameter.

A communication method according to an exemplary embodiment of the present disclosure includes: generating, by an access point, a parameter relating to uplink transmission power control, based on information on transmission power control received from another access point; and transmitting, by the access point, a control signal including the parameter.

A communication method according to an exemplary embodiment of the present disclosure includes: receiving, by a terminal, a control signal including a parameter that relates to control of an uplink transmission power and is generated based on information on transmission power control received from another access point; and controlling, by the terminal, the uplink transmission power based on the parameter.

The disclosure of Japanese Patent Application No. 2020-090745, filed on May 25, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 AP
101 configurator
102 STA-directed control signal generator
103 AP-directed control signal generator
104,205 Transmission signal generator
105,201 Radio transceiver
106,202 Received signal demodulator/decoder
200 STA
203 Transmission power calculator
204 Response signal generator

The invention claimed is:

1. An access point, comprising:
control circuitry, which, in operation, generates a parameter relating to uplink transmission power control, based on information on transmission power control received from another access point, wherein the parameter includes information on a target received signal strength of the access point in uplink communication control, and wherein a bit size corresponding to the information on the target received signal strength varies between a case of performing the uplink communication control in coordination between the access point and the other access point and a case of not performing the uplink communication control in coordination between the access point and the other access point; and
transmission circuitry, which, in operation, transmits a control signal including the parameter.

2. The access point according to claim 1, wherein, based on information on coordination of uplink communication control, the control circuitry determines a format of the control signal as a first format in a case where the uplink communication control in coordination between the access point and the other access point is performed, and determines the format of the control signal as a second format in a case where the uplink communication control in coordination between the access point and the other access point is not performed.

3. The access point according to claim 2, wherein the information on the coordination of the uplink communication control includes flag information indicating whether to perform the coordination.

4. The access point according to claim 3, wherein the flag information is included in any one of common information including information common to a plurality of terminals, a signal field in a data unit including the control signal, and a beacon.

5. The access point according to claim 2, wherein:
the information on the coordination of the uplink communication control includes information on a type of the control signal, and
the control circuitry configures the first format in a case where the type of the control signal is a type corresponding to the coordination.

6. An access point, comprising:
control circuitry, which, in operation, generates a parameter relating to uplink transmission power control, based on information on transmission power control received from another access point, wherein the parameter includes an index value associated with a value of a target received signal strength of the access point in uplink communication control, and wherein a difference between a first candidate value for the value of the target received signal strength and a second candidate value for the value of the target received signal strength respectively associated with a first index value and a second index value varies between a case of performing the uplink communication control in coordination between the access point and the other access point and a case of not performing the uplink communication control in coordination between the access point and the other access point; and
transmission circuitry, which, in operation, transmits a control signal including the parameter.

7. A communication method, comprising:
generating, by an access point, a parameter relating to uplink transmission power control, based on information on transmission power control received from another access point, wherein the parameter includes information on a target received signal strength of the access point in uplink communication control, and wherein a bit size corresponding to the information on the target received signal strength varies between a case of performing the uplink communication control in coordination between the access point and the other access point and a case of not performing the uplink communication control in coordination between the access point and the other access point; and
transmitting, by the access point, a control signal including the parameter.

* * * * *